(12) United States Patent
Luo et al.

(10) Patent No.: US 12,232,110 B2
(45) Date of Patent: Feb. 18, 2025

(54) METHOD OF MONITORING A PHYSICAL DOWNLINK CONTROL CHANNEL, AND TERMINAL DEVICE AND NETWORK DEVICE THEREFOR

(71) Applicant: Huawei Technologies Co., Ltd., Shenzhen (CN)

(72) Inventors: Zhihu Luo, Beijing (CN); Jun Li, Shanghai (CN); Zhe Jin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 372 days.

(21) Appl. No.: 17/587,517

(22) Filed: Jan. 28, 2022

(65) Prior Publication Data

US 2022/0150932 A1    May 12, 2022

Related U.S. Application Data

(63) Continuation of application No. PCT/CN2019/098239, filed on Jul. 29, 2019.

(51) Int. Cl.
*H04W 72/1273* (2023.01)
*H04W 72/0446* (2023.01)
*H04W 72/23* (2023.01)

(52) U.S. Cl.
CPC ............ *H04W 72/1273* (2013.01); *H04W 72/0446* (2013.01); *H04W 72/23* (2023.01)

(58) Field of Classification Search
CPC ............ H04W 72/1273; H04W 72/23; H04W 72/0446
See application file for complete search history.

(56) References Cited

U.S. PATENT DOCUMENTS

| 2017/0359746 A1 | 12/2017 | Lee et al. | |
| 2018/0054792 A1* | 2/2018 | Lee | H04B 17/24 |
| 2020/0314811 A1* | 10/2020 | Lin | H04L 5/0094 |

FOREIGN PATENT DOCUMENTS

| CN | 101801097 A | 8/2010 |
| CN | 103139819 A | 6/2013 |
| CN | 105992378 A | 10/2016 |
| CN | 108781199 A | 11/2018 |
| EP | 3890427 A1 | 10/2021 |
| WO | 2018204491 A1 | 11/2018 |
| WO | 2019031850 A1 | 2/2019 |

OTHER PUBLICATIONS

"Discussion on Multiple Transport Blocks Scheduling in NB-IoT," Agenda Item: 6.2.2.3, Source: LG Electronics, Document for: Discussion and Decision, 3GPP TSG RAN WG1 #97, R1-1906692, Xi'an, China, Apr. 8-12, 2019, 7 pages.

(Continued)

*Primary Examiner* — Jackie Zuniga Abad
(74) *Attorney, Agent, or Firm* — Slater Matsil, LLP

(57) ABSTRACT

This application provides an information transmission method, a terminal device, and a network device. In technical solutions of this application, a target time interval in which a physical downlink control channel is not monitored or DCI is not sent is determined based on a value relationship between a quantity of TBs scheduled by the DCI and a first value, and a solution of sending and monitoring a physical downlink control channel in a scenario in which one piece of DCI schedules a plurality of TBs is specified, so that the physical downlink control channel can be effectively sent and monitored.

16 Claims, 14 Drawing Sheets

(56) References Cited

OTHER PUBLICATIONS

"On UE Adaptation Schemes," Agenda Item: 7.2.9.2, Source: Samsung, Document for: Discussion and Decision, 3GPP TSG RAN WG1 RAN1 Meeting #96, R1-1902318, Athens, Greece, Mar. 1-25, 2019, 16 pages.
"On Potential Techniques for UE Power Saving," Source: Intel Corporation, Agenda Item: 7.2.9.2, Document for Discussion and Decision, 3GPP TSG RAN WG1 Meeting #96, R1-1902508, Athens, Greece, Feb. 25-Mar. 1, 2019, 18 pages.
"Scheduling of Multiple Transport Blocks," Agenda Item: 6.2.1.3, Source: Huawei, HiSilicon, Document for: Discussion and Decision, 3GPP TSG RAN WG1 Meeting #97, R1-1905979, Reno, USA, May 13-17, 2019, 10 pages.
3GPP TS 36.213 V15.6.0 (Jun. 2019), 3rd Generation Partnership Project; Technical Specification Group Radio Access Network; Evolved Universal Terrestrial Radio Access (E-UTRA); Physical layer procedures(Release 15), 551 pages.
3GPP TS 36.212 V15.6.0 (Jun. 2019), 3rd Generation Partnership Project; Technical Specification Group Radio Access Network; Evolved Universal Terrestrial Radio Access (E-UTRA); Multiplexing and channel coding(Release 15), 246 pages.
3GPP TS 36.141 V16.2.0 (Jun. 2019), 3rd Generation Partnership Project; Technical Specification Group Radio Access Network; Evolved Universal Terrestrial Radio Access (E-UTRA); Base Station (BS) conformance testing(Release 16), 456 pages.
Huawei, HiSilicon: "Scheduling multiple DL/UL transport blocks for SC-PTM and unicast." 3GPP TSG RAN WG1 Meeting #94bis, Chengdu, China, Oct. 8-12, 2018. R1-1810084, total 6 pages.
LG Electronics: "Discussion on multiple transport blocks scheduling in MTC." 3GPP TSG RAN WG1 Meeting #95, Spokane, USA, Nov. 12-16, 2018. R1-1812527, total 7 pages.

* cited by examiner

METHOD OF MONITORING A PHYSICAL DOWNLINK CONTROL CHANNEL, AND TERMINAL DEVICE AND NETWORK DEVICE THEREFOR

CROSS-REFERENCE TO RELATED APPLICATIONS

This application is a continuation of International Application No. PCT/CN2019/098239, filed on Jul. 29, 2019, the disclosure of which is hereby incorporated by reference in its entirety.

TECHNICAL FIELD

This application relates to the communication field, and more specifically, to an information transmission method, a terminal device, and a network device.

BACKGROUND

The internet of things (IoT) is an "internet for thing-to-thing connection", and extends user ends of the internet to any object, to perform information exchange and communication. Such a communication manner is also referred to as machine type communication (machine type communications, MTC), and a communication node is referred to as an MTC terminal. Typical internet of things applications may include a smart grid, smart agriculture, smart transportation, a smart home, environment detection, and the like. The internet of things needs to be applied to a plurality of scenarios, for example, from an outdoor scenario to an indoor scenario, and from an overground scenario to an underground scenario. Therefore, many special requirements are imposed on designs of the internet of things.

Coverage enhancement: Many MTC applications are used in an environment in which coverage is poor. For example, an electric meter or a water meter is usually mounted indoors, even in a basement, or other places in which wireless network signals are poor. In this case, a coverage enhancement technology is required to resolve this problem.

Support for a large quantity of low-rate devices: A quantity of MTC devices is far greater than a quantity of devices for human-to-human communication. However, the MTC device transmits small data packets and is insensitive to a delay.

Extremely low costs: Many MTC applications require to obtain and use the MTC devices at extremely low costs, to deploy the MTC devices in a large scale.

Low energy consumption: In most cases, the MTC device is powered by a battery. However, in many scenarios, MTC further requires that the MTC device can be used for more than 10 years without replacing the battery. This requires the MTC device to be able to operate with extremely low power consumption.

To meet these special requirements, the 3rd generation partnership project (3GPP), a mobile communication standards organization, adopted a new research project at the GERAN #62 conference to study a method for supporting the internet of things having extremely low complexity and low costs in a cellular network, and initiated the research project as an NB-IoT project at the radio access network (RAN) #69 conference.

In the Rel-14 narrowband internet of things (narrowband Internet of thing, NB-IoT), a communication technology of two hybrid automatic repeat request (HARQ) processes (hereinafter referred to as two HARQs) is introduced. In addition, the two HARQ processes are scheduled by using two pieces of independent downlink control information (DCI). Typical scheduling of two HARQs for downlink data transmission is shown in FIG. 1. In FIG. 1, DCI #1 schedules a transport block (TB) #1, and the TB #1 is carried on a narrowband physical downlink shared channel (NPDSCH) #1; and DCI #2 schedules a TB #2, and the TB #2 is carried on an NPDSCH #2. Typical scheduling of two HARQs for uplink data transmission is shown in FIG. 2. In FIG. 2, DCI #1 schedules a TB #1, and the TB #1 is carried on a narrowband physical uplink shared channel (NPUSCH) #1; and DCI #2 schedules a TB #2, and the TB #2 is carried on an NPUSCH #2. In suffixes in FIG. 1 and FIG. 2, "#1" and "#2" respectively represent two HARQ processes, and "A/N" represents acknowledgment (ACK)/negative acknowledgment (NACK).

In the Rel-16 NB-IoT, a scheduling enhancement feature is introduced, and one piece of DCI can be used to schedule a plurality of TBs, which means that one piece of DCI can be used to schedule a plurality of HARQ processes. Two HARQs are used as an example. As shown in FIG. 3 and FIG. 4, one piece of DCI is used to schedule two HARQ processes. One piece of DCI schedules two NPDSCHs or two NPUSCHs at the same time. In suffixes, "#1" and "#2" respectively represent the two HARQ processes, and "A/N" represents ACK/NACK. Compared with Rel-14 in which one piece of DCI is used to schedule one HARQ process, in Rel-16, DCI resource overheads can be reduced.

However, for a scenario in which one piece of DCI schedules a plurality of TBs, a solution for sending and monitoring a physical downlink control channel is not specified in a current protocol.

SUMMARY

This application provides an information transmission method, a terminal device, and a network device, and specifies a solution for sending and monitoring a physical downlink control channel in a scenario in which one piece of DCI schedules a plurality of TBs, so that the physical downlink control channel can be effectively sent and monitored.

According to a first aspect, an information transmission method is provided. The method includes: A terminal device receives first downlink control information DCI sent by a network device, where a quantity of transport blocks TBs scheduled by the first DCI is N, and N is an integer greater than or equal to 1. The terminal device skips monitoring a physical downlink control channel in a target time interval, where the target time interval is determined based on a value relationship between N and a first value.

Optionally, the method further includes: The terminal device receives, from the network device, the N TBs scheduled by the first DCI; or sends, to the network device, the N TBs scheduled by the first DCI.

In the foregoing technical solution, the terminal device receives the first DCI sent by the network device, and the value relationship between the quantity N of TBs scheduled by the first DCI and the first value may indicate whether the network device continues to send DCI subsequently. In this way, the terminal device may determine, based on the value relationship between N and the first value, the target time interval in which the physical downlink control channel does not need to be monitored, so that a physical downlink control channel can be effectively monitored in a scenario in which one piece of DCI schedules a plurality of TBs.

In a possible implementation, when N is equal to the first value, the target time interval includes a time unit between a first time unit and a second time unit; the first time unit is a time unit in which transmission of a physical downlink control channel used to carry the first DCI ends; and the second time unit is a time unit in which transmission of a physical uplink shared channel or a physical downlink shared channel starts, where the physical uplink shared channel or the physical downlink shared channel is used to carry the $1^{st}$ TB scheduled by the first DCI, or the uplink shared channel or the downlink shared channel is used to carry the N TBs scheduled by the first DCI. In this case, the target time interval does not include the first time unit and the second time unit, but includes one or more time units between the first time unit and the second time unit.

It may be understood that the time unit may be a superframe, a frame, a half-frame, a subframe, a slot, a symbol, a sampling point, or the like.

In the foregoing technical solution, when N is equal to the first value, it indicates that the network device no longer sends DCI during this scheduling. Therefore, the terminal device may no longer monitor the physical downlink control channel from a moment at which transmission of the first DCI ends to a moment at which transmission of the uplink shared channel or the downlink shared channel scheduled by the first DCI starts, thereby reducing power consumption of the terminal device.

In a possible implementation, when N is equal to the first value, transmission duration of physical uplink shared channels used to carry the N TBs scheduled by the first DCI is greater than 256 milliseconds.

Optionally, the transmission duration is duration from a fourth time unit to a fifth time unit. The fourth time unit is a time unit in which transmission of a physical uplink shared channel used to carry the $1^{st}$ TB in the N TBs starts, and the fifth time unit is a time unit in which transmission of a physical uplink shared channel used to carry the last TB in the N TBs ends. In this case, the transmission duration includes the fourth time unit and the fifth time unit.

In the Rel-14 NB-IoT, a value of a scheduling delay between the DCI and the physical uplink shared channel is limited, and a maximum value of the scheduling delay is 64 ms. Therefore, to avoid a transmission conflict between the DCI and the physical uplink shared channel, the transmission duration of the physical uplink shared channels cannot exceed 256 ms. In the scenario in which one piece of DCI schedules a plurality of TBs, when N is equal to the first value, it indicates that the network device no longer sends DCI during this scheduling, so that the foregoing transmission conflict does not occur. Therefore, a limitation that the transmission duration of the physical uplink shared channels cannot exceed 256 ms can be canceled. In this way, the solution in which one piece of DCI schedules a plurality of TBs is also used in a scenario having a large quantity of repetitions, to improve a transmission rate.

It may be understood that, when N is equal to the first value, the transmission duration of the physical uplink shared channels may not be limited to 256 ms. Therefore, in an actual case, the transmission duration of the physical uplink shared channels used to carry the N TBs scheduled by the first DCI may be greater than, equal to, or less than 256 ms.

In a possible implementation, when N is less than the first value, the target time interval includes a time unit between a third time unit and a second time unit; the third time unit is an $M^{th}$ time unit before transmission of a physical uplink shared channel or a physical downlink shared channel starts; and the second time unit is a time unit in which transmission of the physical uplink shared channel or the physical downlink shared channel starts, where the third time unit is after a time unit in which transmission of a physical downlink control channel used to carry the first DCI ends, the physical uplink shared channel or the physical downlink shared channel is transmitted after the physical downlink control channel used to carry the first DCI, and M is an integer greater than or equal to 2. In this case, the target time interval does not include the third time unit and the second time unit, but includes one or more time units between the third time unit and the second time unit.

It may be understood that the time unit may be a superframe, a frame, a half-frame, a subframe, a slot, a symbol, a sampling point, or the like.

In the foregoing technical solution, when N is less than the first value, it indicates that the network device may continue to send DCI. The terminal device skips monitoring the physical downlink control channel in a time segment before transmission of the uplink shared channel or the downlink shared channel starts. In other words, the terminal device still monitors the physical downlink control channel in a time segment after receiving the first DCI. This can reduce a probability of missing DCI.

In a possible implementation, when N is less than the first value, the method further includes: The terminal device receives second DCI sent by the network device, where duration from a time unit in which transmission of a physical uplink shared channel used to carry a TB scheduled by the second DCI ends to a time unit in which transmission of a physical uplink shared channel used to carry a TB scheduled by the first DCI starts is less than or equal to 256 milliseconds.

Optionally, the transmission duration is duration from a fourth time unit to a fifth time unit. The fourth time unit is a time unit in which transmission of a physical uplink shared channel used to carry the $1^{st}$ TB in the N TBs starts, and the fifth time unit is a time unit in which transmission of a physical uplink shared channel used to carry the last TB in the N TBs ends. In this case, the transmission duration includes the fourth time unit and the fifth time unit.

In the scenario in which one piece of DCI schedules a plurality of TBs, when N is less than the first value, it indicates that the network device may continue to send DCI. When the terminal device receives the second DCI after receiving the first DCI, the transmission duration of the physical uplink shared channels still needs to be less than or equal to 256 ms, to avoid a transmission conflict between the DCI and the physical uplink shared channel. In this way, data is correctly transmitted.

In a possible implementation, the first value is a preset value, or is configured by the network device.

In a possible implementation, before the terminal device receives the first DCI sent by the network device, the method further includes: The terminal device receives configuration information sent by the network device, where the configuration information is used to activate scheduling enhancement.

It should be understood that scheduling enhancement may alternatively be expressed as "scheduling a plurality of TBs", "scheduling a plurality of TBs by one piece of DCI", "scheduling a plurality of downlink TBs by one piece of DCI", "scheduling a plurality of uplink TBs by one piece of DCI", or the like.

In the foregoing technical solution, the network device notifies, by using the configuration information, the terminal device whether to activate scheduling enhancement. This can improve scheduling flexibility.

In a possible implementation, a search space corresponding to the first DCI is a UE-specific search space USS.

Considering that a new DCI format is introduced due to a scheduling enhancement feature, if scheduling enhancement is used in a CSS, the network device needs to send DCI in two formats to a terminal device that supports the scheduling enhancement feature and a terminal device that does not support the scheduling enhancement feature, to transmit same data and schedule the data. This increases network resource overheads. The terminal device needs to blindly detect the DCI in two formats. This increases blind detection complexity. If scheduling enhancement is limited to be used in the USS, and the USS is the UE-specific search space, the foregoing problems of increasing resource overheads on a network device side and increasing blind detection complexity on a terminal device side can be avoided.

In a possible implementation, the first value is a maximum value of a quantity of TBs that can be scheduled by one piece of DCI.

According to a second aspect, this application provides an information transmission method. The method includes: A network device sends first downlink control information DCI to a terminal device, where a quantity of transport blocks TBs scheduled by the first DCI is N, and N is an integer greater than or equal to 1. The network device skips sending DCI in a target time interval, where the target time interval is determined based on a value relationship between N and a first value.

Optionally, the method further includes: The network device sends, to the terminal device, the N TBs scheduled by the first DCI; or receives, from the terminal device, the N TBs scheduled by the first DCI.

In the foregoing technical solution, the network device sends the first DCI to the terminal device, and determines, based on the value relationship between the quantity N of TBs scheduled by the first DCI and the first value, the target time interval in which the DCI does not need to be sent. In this way, the network device may send the DCI or downlink data to another terminal device in the target time interval, so that a physical downlink control channel can be effectively sent in a scenario in which one piece of DCI schedules a plurality of TBs, thereby improving resource utilization efficiency.

In a possible implementation, when N is equal to the first value, the target time interval includes a time unit between a first time unit and a second time unit; the first time unit is a time unit in which transmission of a physical downlink control channel used to carry the first DCI ends; and the second time unit is a time unit in which transmission of a physical uplink shared channel or a physical downlink shared channel starts, where the physical uplink shared channel or the physical downlink shared channel is used to carry the 1$^{st}$ TB scheduled by the first DCI, or the uplink shared channel or the downlink shared channel is used to carry the N TBs scheduled by the first DCI. In this case, the target time interval does not include the first time unit and the second time unit, but includes one or more time units between the first time unit and the second time unit.

It may be understood that the time unit may be a superframe, a frame, a half-frame, a subframe, a slot, a symbol, a sampling point, or the like.

In the foregoing technical solution, when N is equal to the first value, the network device no longer sends DCI from a moment at which transmission of the first DCI ends to a moment at which transmission of the physical uplink shared channel or the physical downlink shared channel scheduled by the first DCI starts. In this way, the terminal device may no longer monitor the physical downlink control channel, thereby reducing power consumption of the terminal device. The network device may send the DCI or the downlink data to the another terminal device in the target time interval, thereby improving the resource utilization efficiency.

In a possible implementation, when N is equal to the first value, transmission duration of physical uplink shared channels used to carry the N TBs scheduled by the first DCI is greater than 256 milliseconds.

Optionally, the transmission duration is duration from a fourth time unit to a fifth time unit. The fourth time unit is a time unit in which transmission of a physical uplink shared channel used to carry the 1$^{st}$ TB in the N TBs starts, and the fifth time unit is a time unit in which transmission of a physical uplink shared channel used to carry the last TB in the N TBs ends. In this case, the transmission duration includes the fourth time unit and the fifth time unit.

In the Rel-14 NB-IoT, a value of a scheduling delay between the DCI and the physical uplink shared channel is limited, and a maximum value of the scheduling delay is 64 ms. Therefore, to avoid a transmission conflict between the DCI and the physical uplink shared channel, the transmission duration of the physical uplink shared channels cannot exceed 256 ms. In the scenario in which one piece of DCI schedules a plurality of TBs, when N is equal to the first value, it indicates that the network device no longer sends DCI during this scheduling, so that the foregoing transmission conflict does not occur. Therefore, a limitation that the transmission duration of the physical uplink shared channels cannot exceed 256 ms can be canceled. In this way, the solution in which one piece of DCI schedules a plurality of TBs is also used in a scenario having a large quantity of repetitions, to improve a transmission rate.

It may be understood that, when N is equal to the first value, the transmission duration of the physical uplink shared channels may not be limited to 256 ms. Therefore, in an actual case, the transmission duration of the physical uplink shared channels used to carry the N TBs scheduled by the first DCI may be greater than, equal to, or less than 256 ms.

In a possible implementation, when N is less than the first value, the target time interval includes a time unit between a third time unit and a second time unit; the third time unit is an M$^{th}$ time unit before transmission of a physical uplink shared channel or a physical downlink shared channel starts; and the second time unit is a time unit in which transmission of the physical uplink shared channel or the physical downlink shared channel starts, where the third time unit is after a time unit in which transmission of a physical downlink control channel used to carry the first DCI ends, the physical uplink shared channel or the physical downlink shared channel is transmitted after the physical downlink control channel used to carry the first DCI, and M is an integer greater than or equal to 2. In this case, the target time interval does not include the third time unit and the second time unit, but includes one or more time units between the third time unit and the second time unit.

It may be understood that the time unit may be a superframe, a frame, a half-frame, a subframe, a slot, a symbol, a sampling point, or the like.

In the foregoing technical solution, when N is less than the first value, it indicates that the network device may continue to send DCI. The network device does not send the DCI in a time segment before transmission of the physical uplink shared channel or the physical downlink shared channel starts. The network device may send the DCI or the downlink data to the another terminal device in the time interval, thereby improving the resource utilization efficiency. The network device may still send the DCI in a time segment after sending the first DCI. The terminal device continues to monitor the physical downlink control channel in a time segment after receiving the first DCI. This can reduce a probability of missing DCI.

In a possible implementation, when N is less than the first value, the method further includes: The network device sends second DCI to the terminal device, where duration from a time unit in which transmission of a physical uplink shared channel used to carry a TB scheduled by the second DCI ends to a time unit in which transmission of a physical uplink shared channel used to carry a TB scheduled by the first DCI starts is less than or equal to 256 milliseconds.

Optionally, the transmission duration is duration from a fourth time unit to a fifth time unit. The fourth time unit is a time unit in which transmission of a physical uplink shared channel used to carry the $1^{st}$ TB in the N TBs starts, and the fifth time unit is a time unit in which transmission of a physical uplink shared channel used to carry the last TB in the N TBs ends. In this case, the transmission duration includes the fourth time unit and the fifth time unit.

In the scenario in which one piece of DCI schedules a plurality of TBs, when N is less than the first value, it indicates that the network device may continue to send DCI. When the network device sends the second DCI after sending the first DCI, the transmission duration of the physical uplink shared channels still needs to be less than or equal to 256 ms, to avoid a transmission conflict between the DCI and the physical uplink shared channel. In this way, data is correctly transmitted.

In a possible implementation, the first value is a preset value, or is configured by the network device.

In a possible implementation, before the network device sends the first DCI to the terminal device, the method further includes: The network device sends configuration information to the terminal device, where the configuration information is used to activate scheduling enhancement.

It should be understood that scheduling enhancement may alternatively be expressed as "scheduling a plurality of TBs", "scheduling a plurality of TBs by one piece of DCI", "scheduling a plurality of downlink TBs by one piece of DCI", "scheduling a plurality of uplink TBs by one piece of DCI", or the like.

In the foregoing technical solution, the network device notifies, by using the configuration information, the terminal device whether to activate scheduling enhancement. This can improve scheduling flexibility.

In a possible implementation, a search space corresponding to the first DCI is a UE-specific search space USS.

Considering that a new DCI format is introduced due to a scheduling enhancement feature, if scheduling enhancement is used in a CSS, the network device needs to send DCI in two formats to a terminal device that supports the scheduling enhancement feature and a terminal device that does not support the scheduling enhancement feature, to transmit same data and schedule the data. This increases network resource overheads. The terminal device needs to blindly detect the DCI in two formats. This increases blind detection complexity. If scheduling enhancement is limited to be used in the USS, and the USS is the UE-specific search space, the foregoing problems of increasing resource overheads on a network device side and increasing blind detection complexity on a terminal device side can be avoided.

In a possible implementation, the first value is a maximum value of a quantity of TBs that can be scheduled by one piece of DCI.

According to a third aspect, this application provides an information transmission method. The method includes: A network device determines first downlink control information DCI. The network device sends the first DCI to a terminal device, where a quantity of transport blocks TBs scheduled by the first DCI is N, total transmission duration of N physical uplink shared channels scheduled by the first DCI is determined based on a value relationship between N and a first value, the N physical uplink shared channels are used to carry the N TBs scheduled by the first DCI, and N is an integer greater than or equal to 1.

Optionally, the method further includes: The network device receives, from the terminal device, the N TBs scheduled by the first DCI.

In the Rel-14 NB-IoT, a value of a scheduling delay between DCI and a physical uplink shared channel is limited, and a maximum value of the scheduling delay is 64 ms. Therefore, to avoid a transmission conflict between the DCI and the physical uplink shared channel, the transmission duration of the physical uplink shared channels cannot exceed 256 ms. In a scenario in which one piece of DCI schedules a plurality of TBs, when N is equal to the first value, it indicates that the network device no longer sends DCI during this scheduling, so that the foregoing transmission conflict does not occur. Therefore, a limitation that the transmission duration of the physical uplink shared channels cannot exceed 256 ms can be canceled. When N is less than the first value, it indicates that the network device may continue to send DCI, and the transmission duration of the physical uplink shared channels still needs to be less than or equal to 256 ms, so that data can be correctly transmitted. Therefore, in the foregoing technical solution, the total transmission duration of the N physical uplink shared channels scheduled by the first DCI is determined based on the value relationship between N and the first value, and a solution of transmitting a physical uplink shared channel in the scenario in which one piece of DCI schedules a plurality of TBs is provided.

In a possible implementation, the network device skips sending DCI in a target time interval, where the target time interval is determined based on the value relationship.

In the foregoing technical solution, the network device determines, based on the value relationship between the quantity N of TBs scheduled by the first DCI and the first value, the target time interval in which the DCI does not need to be sent, and the terminal device also determines, based on the value relationship between the quantity N of TBs scheduled by the first DCI and the first value, a target time interval in which the DCI does not need to be monitored. In this way, even if the terminal device skips monitoring a physical downlink control channel in the target time interval, the terminal device does not miss detecting the physical downlink control channel, so that a physical downlink control channel can be effectively sent and monitored in the scenario in which one piece of DCI schedules a plurality of TBs.

In a possible implementation, when N is equal to the first value, the transmission duration is greater than 256 milliseconds.

Optionally, the transmission duration is duration from a fourth time unit to a fifth time unit. The fourth time unit is a time unit in which transmission of a physical uplink shared channel used to carry the $1^{st}$ TB in the N TBs starts, and the fifth time unit is a time unit in which transmission of a physical uplink shared channel used to carry the last TB in the N TBs ends. In this case, the transmission duration includes the fourth time unit and the fifth time unit.

In the scenario in which one piece of DCI schedules a plurality of TBs, when N is equal to the first value, it indicates that the network device no longer sends DCI during this scheduling, so that the foregoing transmission conflict does not occur. Therefore, a limitation that the transmission duration of the physical uplink shared channels cannot exceed 256 ms can be canceled. In this way, the solution in which one piece of DCI schedules a plurality of TBs is also used in a scenario having a large quantity of repetitions, to improve a transmission rate.

It may be understood that, when N is equal to the first value, the transmission duration of the physical uplink shared channels may not be limited to 256 ms. Therefore, in an actual case, the transmission duration of the physical uplink shared channels used to carry the N TBs scheduled by the first DCI may be greater than, equal to, or less than 256 ms. In a possible implementation, when N is equal to the first value, the target time interval includes a time unit between a first time unit and a second time unit; the first time unit is a time unit in which transmission of a physical downlink control channel used to carry the first DCI ends; and the second time unit is a time unit in which transmission of a physical uplink shared channel or a physical downlink shared channel starts, where the physical uplink shared channel or the physical downlink shared channel is used to carry the $1^{st}$ TB scheduled by the first DCI, or the uplink shared channel or the downlink shared channel is used to carry the N TBs scheduled by the first DCI. In this case, the target time interval does not include the first time unit and the second time unit, but includes one or more time units between the first time unit and the second time unit.

It may be understood that the time unit may be a superframe, a frame, a half-frame, a subframe, a slot, a symbol, a sampling point, or the like.

In the foregoing technical solution, when N is equal to the first value, the network device no longer sends DCI from a moment at which transmission of the first DCI ends to a moment at which transmission of the physical uplink shared channel or the physical downlink shared channel scheduled by the first DCI starts. In this way, the terminal device may no longer monitor the physical downlink control channel, thereby reducing power consumption of the terminal device.

In a possible implementation, when N is less than the first value, the method further includes: The network device sends second DCI to the terminal device, where duration from a time unit in which transmission of a physical uplink shared channel used to carry a TB scheduled by the second DCI ends to a time unit in which transmission of a physical uplink shared channel used to carry a TB scheduled by the first DCI starts is less than or equal to 256 milliseconds.

Optionally, the transmission duration is duration from a fourth time unit to a fifth time unit. The fourth time unit is a time unit in which transmission of a physical uplink shared channel used to carry the $1^{st}$ TB in the N TBs starts, and the fifth time unit is a time unit in which transmission of a physical uplink shared channel used to carry the last TB in the N TBs ends. In this case, the transmission duration includes the fourth time unit and the fifth time unit.

In the scenario in which one piece of DCI schedules a plurality of TBs, when N is less than the first value, it indicates that the network device may continue to send DCI. When the network device sends the second DCI after sending the first DCI, the transmission duration of the physical uplink shared channels still needs to be less than or equal to 256 ms, to avoid a transmission conflict between the DCI and the physical uplink shared channel. In this way, data is correctly transmitted.

In a possible implementation, when N is less than the first value, the target time interval includes a time unit between a third time unit and a second time unit; the third time unit is an $M^{th}$ time unit before transmission of a physical uplink shared channel or a physical downlink shared channel starts; and the second time unit is a time unit in which transmission of the physical uplink shared channel or the physical downlink shared channel starts, where the third time unit is after a time unit in which transmission of a physical downlink control channel used to carry the first DCI ends, the physical uplink shared channel or the physical downlink shared channel is transmitted after the physical downlink control channel used to carry the first DCI, and M is an integer greater than or equal to 2. In this case, the target time interval does not include the third time unit and the second time unit, but includes one or more time units between the third time unit and the second time unit.

It may be understood that the time unit may be a superframe, a frame, a half-frame, a subframe, a slot, a symbol, a sampling point, or the like.

In the foregoing technical solution, when N is less than the first value, it indicates that the network device may continue to send DCI. The network device does not send the DCI in a time segment before transmission of the physical uplink shared channel or the physical downlink shared channel starts. The network device may send the DCI or downlink data to another terminal device in the time interval, thereby improving resource utilization efficiency. The network device may still send the DCI in a time segment after sending the first DCI. The terminal device continues to monitor the physical downlink control channel in a time segment after receiving the first DCI. This can reduce a probability of missing DCI.

In a possible implementation, the first value is a preset value, or is determined by the network device.

In a possible implementation, before the network device sends the first DCI to the terminal device, the method further includes: The network device sends configuration information to the terminal device, where the configuration information is used to activate scheduling enhancement.

It should be understood that scheduling enhancement may alternatively be expressed as "scheduling a plurality of TBs", "scheduling a plurality of TBs by one piece of DCI", "scheduling a plurality of downlink TBs by one piece of DCI", "scheduling a plurality of uplink TBs by one piece of DCI", or the like.

In the foregoing technical solution, the network device notifies, by using the configuration information, the terminal device whether to activate scheduling enhancement. This can improve scheduling flexibility.

In a possible implementation, a search space corresponding to the first DCI is a UE-specific search space USS.

Considering that a new DCI format is introduced due to a scheduling enhancement feature, if scheduling enhancement is used in a CSS, the network device needs to send DCI in two formats to a terminal device that supports the scheduling enhancement feature and a terminal device that does not support the scheduling enhancement feature, to transmit same data and schedule the data. This increases network resource overheads. The terminal device needs to blindly detect the DCI in two formats. This increases blind detection complexity. If scheduling enhancement is limited to be used in the USS, and the USS is the UE-specific search space, the foregoing problems of increasing resource overheads on a network device side and increasing blind detection complexity on a terminal device side can be avoided.

In a possible implementation, the first value is a maximum value of a quantity of TBs that can be scheduled by one piece of DCI.

According to a fourth aspect, this application provides an information transmission method. The method includes: A terminal device receives first downlink control information DCI sent by a network device, where a quantity of transport blocks TBs scheduled by the first DCI is N, total transmission duration of N physical uplink shared channels scheduled by the first DCI is determined based on a value relationship between N and a first value, the N physical uplink shared channels are used to carry the N TBs scheduled by the first DCI, and N is an integer greater than or equal to 1. The terminal device sends data to the network device based on the first DCI.

Optionally, the method further includes: The terminal device sends, to the network device, the N TBs scheduled by the first DCI.

In the Rel-14 NB-IoT, a value of a scheduling delay between DCI and the physical uplink shared channel is limited, and a maximum value of the scheduling delay is 64 ms. Therefore, to avoid a transmission conflict between the DCI and the physical uplink shared channel, the transmission duration of the physical uplink shared channels cannot exceed 256 ms. In a scenario in which one piece of DCI schedules a plurality of TBs, when N is equal to the first value, it indicates that the network device no longer sends DCI during this scheduling, so that the foregoing transmission conflict does not occur. Therefore, a limitation that the transmission duration of the physical uplink shared channels cannot exceed 256 ms can be canceled. When N is less than the first value, it indicates that the network device may continue to send DCI, and the transmission duration of the physical uplink shared channels still needs to be less than or equal to 256 ms, so that data can be correctly transmitted. Therefore, in the foregoing technical solution, the total transmission duration of the N physical uplink shared channels scheduled by the first DCI is determined based on the value relationship between N and the first value, and a solution of transmitting a physical uplink shared channel in the scenario in which one piece of DCI schedules a plurality of TBs is provided.

In a possible implementation, the terminal device skips monitoring a physical downlink control channel in a target time interval, where the target time interval is determined based on the value relationship.

In the foregoing technical solution, the terminal device receives the first DCI sent by the network device, and the value relationship between the quantity N of TBs scheduled by the first DCI and the first value may indicate whether the network device continues to send the DCI subsequently. In this way, the terminal device may determine, based on the value relationship between N and the first value, the target time interval in which the physical downlink control channel does not need to be monitored, so that a physical downlink control channel can be effectively sent and monitored in the scenario in which one piece of DCI schedules a plurality of TBs.

In a possible implementation, when N is equal to the first value, the transmission duration is greater than 256 milliseconds.

Optionally, the transmission duration is duration from a fourth time unit to a fifth time unit. The fourth time unit is a time unit in which transmission of a physical uplink shared channel used to carry the 1$^{st}$ TB in the N TBs starts, and the fifth time unit is a time unit in which transmission of a physical uplink shared channel used to carry the last TB in the N TBs ends. In this case, the transmission duration includes the fourth time unit and the fifth time unit.

In the Rel-14, to avoid the transmission conflict between the DCI and the physical uplink shared channel, the transmission duration of the physical uplink shared channels cannot exceed 256 ms. In the scenario in which one piece of DCI schedules a plurality of TBs, when N is equal to the first value, it indicates that the network device no longer sends DCI during this scheduling, so that the foregoing transmission conflict does not occur. Therefore, a limitation that the transmission duration of the physical uplink shared channels cannot exceed 256 ms can be canceled. In this way, the solution in which one piece of DCI schedules a plurality of TBs is also used in a scenario having a large quantity of repetitions, to improve a transmission rate.

It may be understood that, when N is equal to the first value, the transmission duration of the physical uplink shared channels may not be limited to 256 ms. Therefore, in an actual case, the transmission duration of the physical uplink shared channels used to carry the N TBs scheduled by the first DCI may be greater than, equal to, or less than 256 ms.

In a possible implementation, when N is equal to the first value, the target time interval includes a time unit between a first time unit and a second time unit; the first time unit is a time unit in which transmission of a physical downlink control channel used to carry the first DCI ends; and the second time unit is a time unit in which transmission of a physical uplink shared channel or a physical downlink shared channel starts, where the physical uplink shared channel or the physical downlink shared channel is used to carry the 1$^{st}$ TB scheduled by the first DCI, or the uplink shared channel or the downlink shared channel is used to carry the N TBs scheduled by the first DCI. In this case, the target time interval does not include the first time unit and the second time unit, but includes one or more time units between the first time unit and the second time unit.

It may be understood that the time unit may be a superframe, a frame, a half-frame, a subframe, a slot, a symbol, a sampling point, or the like.

In the foregoing technical solution, when N is equal to the first value, it indicates that the network device no longer sends DCI during this scheduling. Therefore, the terminal device may no longer monitor the physical downlink control channel from a moment at which transmission of the first DCI ends to a moment at which transmission of the physical uplink shared channel or the physical downlink shared channel scheduled by the first DCI starts, thereby reducing power consumption of the terminal device.

In a possible implementation, when N is less than the first value, the method further includes: The terminal device receives second DCI sent by the network device, where duration from a time unit in which transmission of a physical uplink shared channel used to carry a TB scheduled by the second DCI ends to a time unit in which transmission of a physical uplink shared channel used to carry a TB scheduled by the first DCI starts is less than or equal to 256 milliseconds.

Optionally, the transmission duration is duration from a fourth time unit to a fifth time unit. The fourth time unit is a time unit in which transmission of a physical uplink shared channel used to carry the 1$^{st}$ TB in the N TBs starts, and the fifth time unit is a time unit in which transmission of a physical uplink shared channel used to carry the last TB in the N TBs ends. In this case, the transmission duration includes the fourth time unit and the fifth time unit.

In the scenario in which one piece of DCI schedules a plurality of TBs, when N is less than the first value, it indicates that the network device may continue to send DCI. When the terminal device receives the second DCI after receiving the first DCI, the transmission duration of the physical uplink shared channels still needs to be less than or equal to 256 ms, to avoid the transmission conflict between the DCI and the physical uplink shared channel. In this way, data is correctly transmitted.

In a possible implementation, when N is less than the first value, the target time interval includes a time unit between a third time unit and a second time unit; the third time unit is an $M^{th}$ time unit before transmission of a physical uplink shared channel or a physical downlink shared channel starts; and the second time unit is a time unit in which transmission of the physical uplink shared channel or the physical downlink shared channel starts, where the third time unit is after a time unit in which transmission of a physical downlink control channel used to carry the first DCI ends, the physical uplink shared channel or the physical downlink shared channel is transmitted after the physical downlink control channel used to carry the first DCI, and M is an integer greater than or equal to 2. In this case, the target time interval does not include the third time unit and the second time unit, but includes one or more time units between the third time unit and the second time unit.

It may be understood that the time unit may be a superframe, a frame, a half-frame, a subframe, a slot, a symbol, a sampling point, or the like.

In the foregoing technical solution, when N is less than the first value, it indicates that the network device may continue to send DCI. The terminal device skips monitoring the physical downlink control channel in a time segment before transmission of the uplink shared channel or the downlink shared channel starts. In other words, the terminal device still monitors the physical downlink control channel in a time segment after receiving the first DCI. This can reduce a probability of missing DCI. In a possible implementation, the first value is a preset value, or is determined by the network device.

In a possible implementation, before the terminal device receives the first DCI sent by the network device, the method further includes: The terminal device receives configuration information sent by the network device, where the configuration information is used to activate scheduling enhancement.

It should be understood that scheduling enhancement may alternatively be expressed as "scheduling a plurality of TBs", "scheduling a plurality of TBs by one piece of DCI", "scheduling a plurality of downlink TBs by one piece of DCI", "scheduling a plurality of uplink TBs by one piece of DCI", or the like.

In the foregoing technical solution, the network device notifies, by using the configuration information, the terminal device whether to activate scheduling enhancement. This can improve scheduling flexibility.

In a possible implementation, a search space corresponding to the first DCI is a UE-specific search space USS.

Considering that a new DCI format is introduced due to a scheduling enhancement feature, if scheduling enhancement is used in a CSS, the network device needs to send DCI in two formats to a terminal device that supports the scheduling enhancement feature and a terminal device that does not support the scheduling enhancement feature, to transmit same data and schedule the data. This increases network resource overheads. The terminal device needs to blindly detect the DCI in two formats. This increases blind detection complexity. If scheduling enhancement is limited to be used in the USS, and the USS is the UE-specific search space, the foregoing problems of increasing resource overheads on a network device side and increasing blind detection complexity on a terminal device side can be avoided.

In a possible implementation, the first value is a maximum value of a quantity of TBs that can be scheduled by one piece of DCI.

According to a fifth aspect, this application provides a terminal device. The terminal device includes a module configured to perform the method according to any one of the first aspect or the implementations of the first aspect.

According to a sixth aspect, this application provides a network device. The network device includes a module configured to perform any one of the second aspect or the implementations of the second aspect.

According to a seventh aspect, this application provides a network device. The network device includes a module configured to perform any one of the third aspect or the implementations of the third aspect.

According to an eighth aspect, this application provides a terminal device. The terminal device includes a module configured to perform any one of the fourth aspect or the implementations of the fourth aspect.

According to a ninth aspect, this application provides a chip. The chip is connected to a memory, and is configured to read and execute a software program stored in the memory, to implement the method according to any one of the first aspect or the implementations of the first aspect.

According to a tenth aspect, this application provides a chip. The chip is connected to a memory, and is configured to read and execute a software program stored in the memory, to implement the method according to any one of the second aspect or the implementations of the second aspect.

According to an eleventh aspect, this application provides a chip. The chip is connected to a memory, and is configured to read and execute a software program stored in the memory, to implement the method according to any one of the third aspect or the implementations of the third aspect.

According to a twelfth aspect, this application provides a chip. The chip is connected to a memory, and is configured to read and execute a software program stored in the memory, to implement the method according to any one of the fourth aspect or the implementations of the fourth aspect.

According to a thirteenth aspect, this application provides a terminal device. The terminal device includes a transceiver, a processor, and a memory, and is configured to perform the method according to any one of the first aspect or the implementations of the first aspect.

According to a fourteenth aspect, this application provides a network device. The network device includes a transceiver, a processor, and a memory, and is configured to perform the method according to any one of the second aspect or the implementations of the second aspect.

According to a fifteenth aspect, this application provides a network device. The network device includes a transceiver, a processor, and a memory, and is configured to perform the method according to any one of the third aspect or the implementations of the third aspect.

According to a sixteenth aspect, this application provides a terminal device. The terminal device includes a transceiver, a processor, and a memory, and is configured to perform the method according to any one of the fourth aspect or the implementations of the fourth aspect.

According to a seventeenth aspect, this application provides a computer-readable storage medium. The computer-readable storage medium includes instructions. When the instructions are run on a terminal device, the terminal device is enabled to perform the method according to any one of the first aspect or the implementations of the first aspect.

According to an eighteenth aspect, this application provides a computer-readable storage medium. The computer-readable storage medium includes instructions. When the instructions are run on a network device, the network device is enabled to perform the method according to any one of the second aspect or the implementations of the second aspect.

According to a nineteenth aspect, this application provides a computer-readable storage medium. The computer-readable storage medium includes instructions. When the instructions are run on a network device, a network device is enabled to perform the method according to any one of the third aspect or the implementations of the third aspect.

According to a twentieth aspect, this application provides a computer-readable storage medium. The computer-readable storage medium includes instructions. When the instructions are run on a terminal device, a terminal device is enabled to perform the method according to any one of the fourth aspect or the implementations of the fourth aspect.

According to a twenty-first aspect, this application provides a computer program product. When the computer program product runs on a terminal device, the terminal device is enabled to perform the method according to any one of the first aspect or the implementations of the first aspect.

According to a twenty-second aspect, this application provides a computer program product. When the computer program product runs on a network device, the network device is enabled to perform the method according to any one of the second aspect or the implementations of the second aspect.

According to a twenty-third aspect, this application provides a computer program product. When the computer program product runs on a network device, the network device is enabled to perform the method according to any one of the third aspect or the implementations of the third aspect.

According to a twenty-fourth aspect, this application provides a computer program product. When the computer program product runs on a terminal device, the terminal device is enabled to perform the method according to any one of the fourth aspect or the implementations of the fourth aspect.

According to a twenty-fifth aspect, this application provides a communication system. The communication system includes the terminal device according to the fifth aspect and the network device according to the sixth aspect, or the network device according to the seventh aspect and the terminal device according to the eighth aspect, or the terminal device according to the ninth aspect and the network device according to the tenth aspect, or the network device according to the eleventh aspect and the terminal device according to the twelfth aspect.

DETAILED DESCRIPTION OF ILLUSTRATIVE EMBODIMENTS

The following describes technical solutions of this application with reference to the accompanying drawings.

The technical solutions of the embodiments of this application may be applied to various communication systems, provided that an entity in the communication system can send information and another entity in the communication system can receive information. For example, the communication system is a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future 5th generation (5G) system, a new radio (NR) system, an NB-IoT system, an enhanced machine type communication (eMTC) system, or a long term evolution machine type communication (LTE-M or LTE-MTC) system. It may be understood that the technical solutions of the embodiments of this application may be applied to a communication system used in a licensed frequency band, for example, LTE, 5G, or NR, or may be applied to LTE, 5G, or NR used in an unlicensed frequency band, for example, licensed spectrum assisted access (licensed assisted access, LAA) or NR-based access to unlicensed spectrum.

Figure 1:
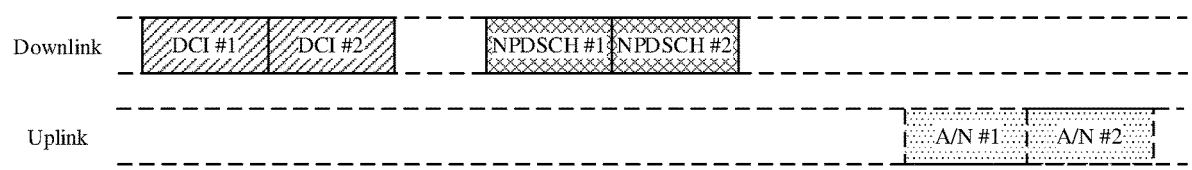
FIG. 1 is a schematic diagram of scheduling of two downlink HARQs.
Figure 2:
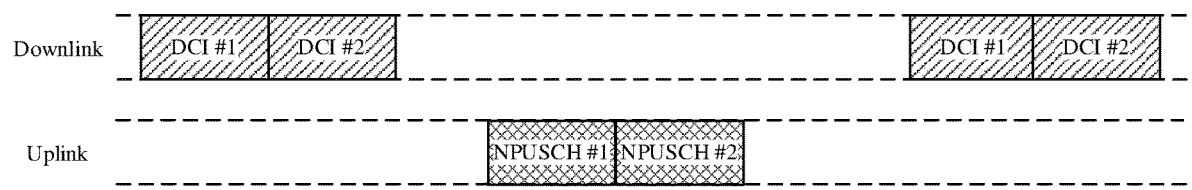
FIG. 2 is a schematic diagram of scheduling of two uplink HARQs.
Figure 3:
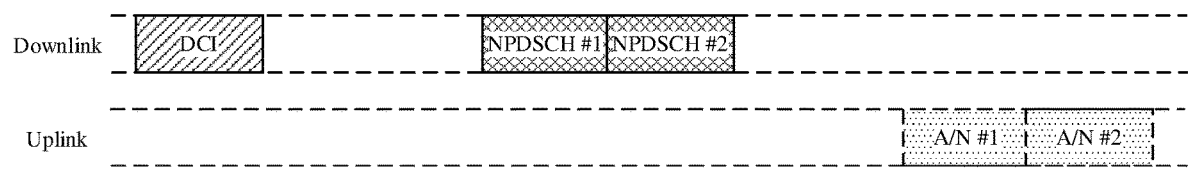
FIG. 3 is a schematic diagram of another scheduling of two downlink HARQs.
Figure 4:
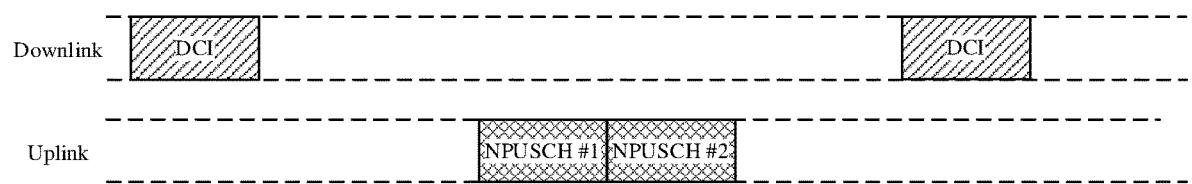
FIG. 4 is a schematic diagram of another scheduling of two uplink HARQs.
Figure 5:
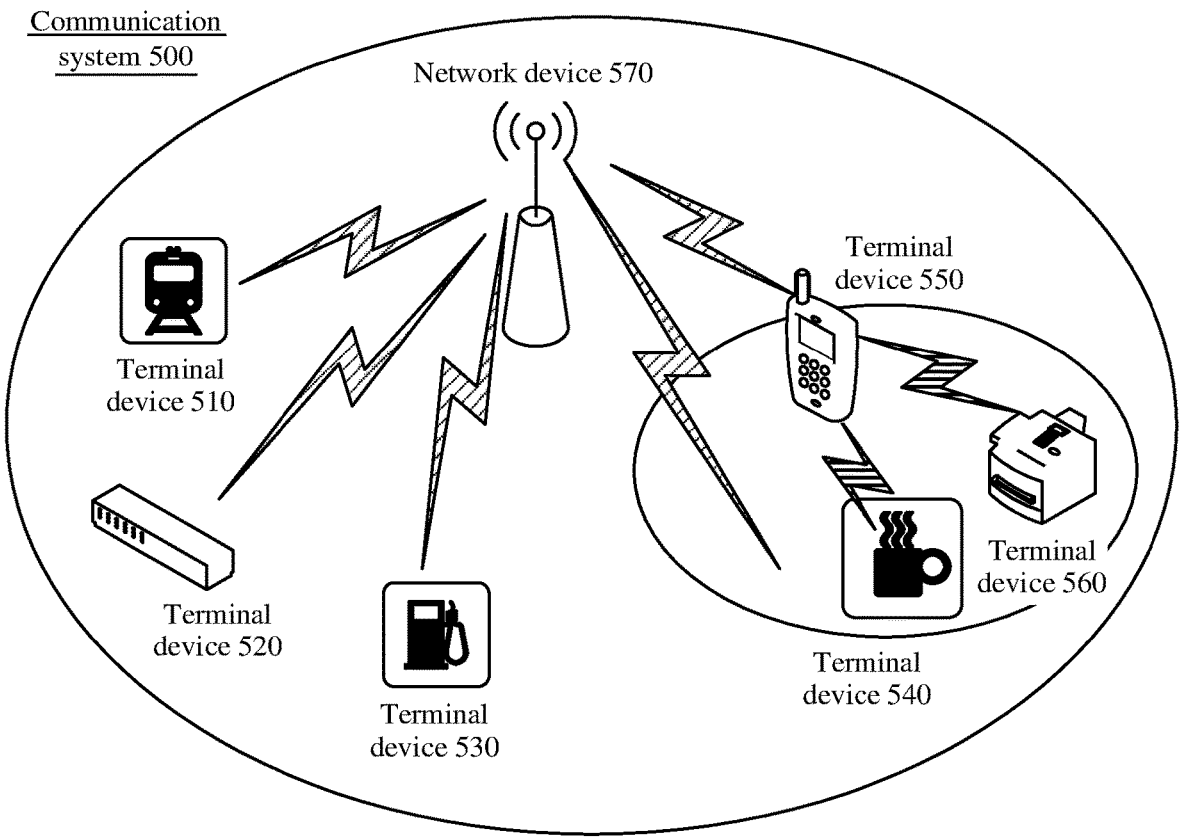
FIG. 5 is a schematic diagram of an architecture of a wireless communication system to which an embodiment of this application may be applied.

FIG. 5 is a schematic diagram of an architecture of a wireless communication system 500 to which an embodiment of this application may be applied. As shown in FIG. 5, the wireless communication system 500 may include a network device 570 and terminal devices 510 to 560. The terminal devices 510 to 560 are connected to the network device 570 in a wireless manner, and the network device 570 may send information to one or more of the terminal devices 510 to 560. In addition, the terminal devices 540 to 560 also form a communication system. In the communication system, the terminal device 550 may send information to one or both of the terminal device 540 and the terminal device 560. The terminal device may be located at a fixed location, or may be mobile. FIG. 5 is merely a schematic diagram. The communication system may further include another network device, for example, a wireless relay device and a wireless backhaul device, which are not shown in FIG. 5. Quantities of network devices and terminal devices included in the mobile communication system are not limited in the embodiments of this application.

In the wireless communication system 500, the terminal device may also be referred to as a terminal, user equipment (UE), a mobile station (MS), a mobile terminal (MT), or the like. The terminal device in the embodiments of this application may be a mobile phone, a tablet computer (Pad), or a computer having a wireless transceiver function, or may be a wireless terminal used in scenarios such as a virtual reality (VR), an augmented reality (AR), industrial control, self-driving (self driving), telemedicine (remote medical), a smart grid, transportation safety, a smart city, and a smart home, or the like. In this application, the foregoing terminal device and a chip that can be used in the foregoing terminal device are collectively referred to as a terminal device. It should be understood that a specific technology used by the terminal device and a specific device form are not limited in the embodiments of this application.

In the wireless communication system 500, the network device may be a device configured to communicate with the terminal device, and the network device may be any device having a wireless transceiver function. The device includes but is not limited to an evolved NodeB (evolved node B, eNB), a radio network controller (RNC), a NodeB (node B, NB), a base station controller (BSC), a base transceiver station (BTS), a home base station (for example, a home evolved nodeB or a home node B, HNB), a baseband unit (BBU), and an access point (AP), a wireless relay node, a wireless backhaul node, a transmission point (TP), a transmission reception point (transmission and reception point, TRP), or the like in a wireless fidelity (WIFI) system, or may be a gNB or a transmission point (TRP or TP) in a 5G system such as an NR system, or one antenna panel or a group of antenna panels (including a plurality of antenna panels) of a base station in a 5G system, or may be a network node, for example, a baseband unit (BBU) or a distributed unit (DU), constituting a gNB or a transmission point. In some deployments, the gNB may include a centralized unit (CU) and a DU. The gNB may further include an active antenna unit (AAU). The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (radio access network, RAN), or may be classified into a network device in a core network (CN). This is not limited in this application. It should be understood that, in this application, the network device may be a network device, or may be a chip used in the network device to complete a wireless communication processing function.

Figure 6:
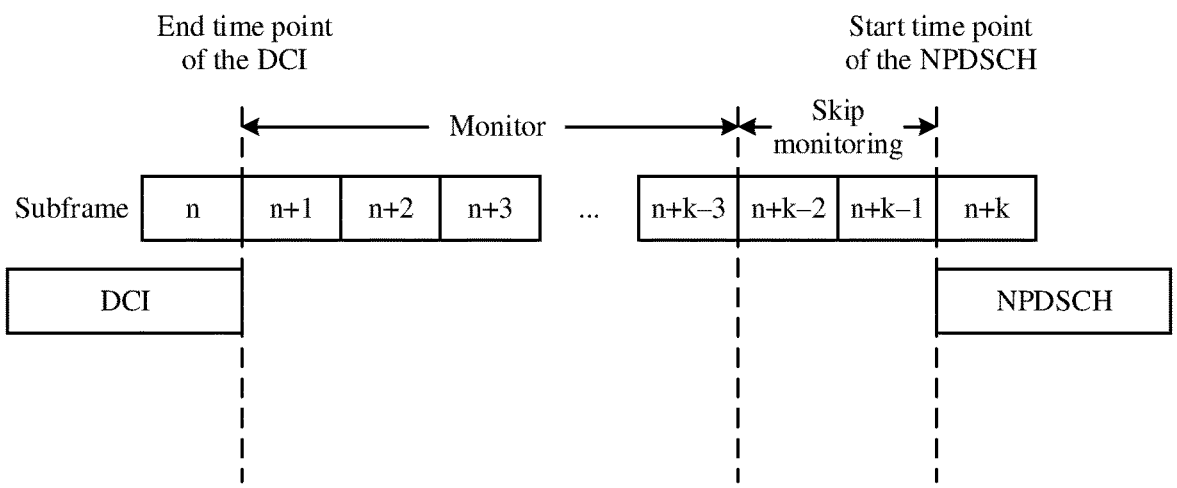
FIG. 6 is a schematic diagram of a timing requirement for scheduling two downlink HARQs.

In the NB-IoT system, if two HARQs are configured for a terminal device, in a scenario in which one piece of DCI schedules one TB, an example in which the terminal device performs downlink transmission is used. As shown in FIG. 6, the terminal device monitors a narrowband physical downlink control channel (NPDCCH) from a subframe n+i to a subframe n+k−3, and skips monitoring the NPDCCH in a subframe n+k−2 and a subframe n+k−1. In this way, the terminal device prepares for transmitting a narrowband physical downlink shared channel (NPDSCH) or a narrowband physical uplink shared channel (NPUSCH). A subframe n is an end subframe of the DCI, and a subframe n+k is a start subframe of the NPDSCH scheduled by the DCI. In addition, uplink transmission performed by the terminal device is similar to downlink transmission. Details are not described herein again. However, for a scenario in which a scheduling enhancement feature is introduced to the Rel-16 NB-IoT, that is, one piece of DCI schedules a plurality of TBs, a solution for sending and monitoring a physical downlink control channel is not specified in a current protocol.

To resolve the foregoing problem, this application provides a data transmission method, and specifies a solution for sending and monitoring a physical downlink control channel in the scenario in which one piece of DCI schedules a plurality of TBs, so that the physical downlink control channel can be effectively sent and monitored.

Figure 7:
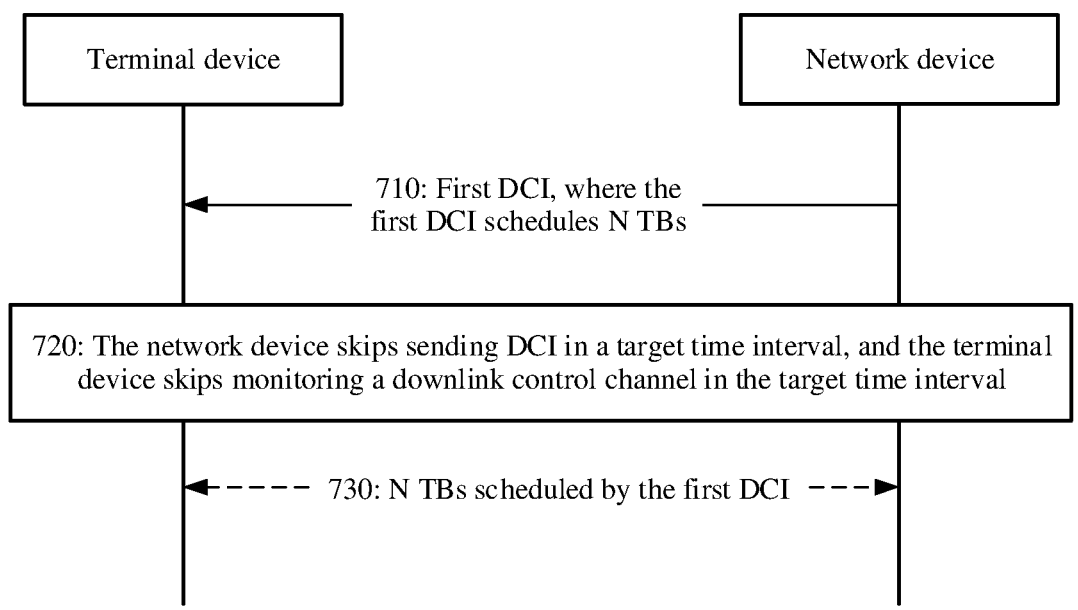
FIG. 7 is a schematic flowchart of an information transmission method according to an embodiment of this application.

FIG. 7 is a schematic flowchart of an information transmission method according to an embodiment of this application. The method in FIG. 7 may be applied to the terminal device and the network device in the wireless communication system shown in FIG. 5. In this embodiment of this application, an example in which a terminal device and a network device are used as execution bodies is used for description. It should be understood that the execution bodies may alternatively be a chip used in the terminal device and a chip used in the network device. This is not specifically limited in this embodiment of this application. The method in FIG. 7 includes at least a part of the following content.

In 710, the network device sends first DCI to the terminal device, and the terminal device receives the first DCI sent by the network device, where a quantity of TBs scheduled by the first DCI is N, and N is an integer greater than or equal to 1.

In 720, the network device skips sending DCI in a target time interval, and the terminal device skips monitoring a physical downlink control channel (not required to monitor NPDCCH) in the target time interval. It may be understood that the physical downlink control channel may alternatively be a physical downlink control channel candidate. In this case, 720 may be expressed as that the network device skips sending the DCI in the target time interval, and the terminal device skips monitoring the physical downlink control channel candidate in the target time interval. This is not limited in this embodiment of this application.

The terminal device and the network device may determine the target time interval based on a value relationship between the quantity N of TBs scheduled by the first DCI and a first value. For ease of description, the first value is represented by X in the following descriptions.

A specific value of X is not specifically limited in this embodiment of this application. In an example, X may be any value agreed upon by the terminal device and the network device. For example, X=1, 2, 3, 4, 5, 6, 7, or 8. Optionally, X is an integer greater than or equal to 2. In another example, X may be a maximum value of a quantity of TBs that can be scheduled by one piece of DCI. In still another example, X may be a quantity of HARQ processes configured by the network device for the terminal device.

Optionally, X may be a preset value, for example, embodied or specified in a protocol. Alternatively, X may be determined by the network device and configured for the terminal device. For example, the network device may indicate X by using RRC signaling, MAC signaling, or DCI. For example, a value of X is one of {1, 2, 4, 8} or one of {1, 2, 3, 4, 5, 6, 7, 8}.

When N=X, to be specific, when the quantity of TBs scheduled by the first DCI has reached a preset quantity of HARQ processes, a maximum value of a quantity of TBs that can be scheduled by the DCI, or the first value, another TB cannot be transmitted between the terminal device and the network device. Therefore, from a moment at which transmission of the first DCI ends to a moment at which transmission of an NPUSCH or an NPDSCH scheduled by the first DCI starts, the network device may no longer send DCI to the terminal device, and the terminal device may not continue to monitor the physical downlink control channel.

Figure 8:
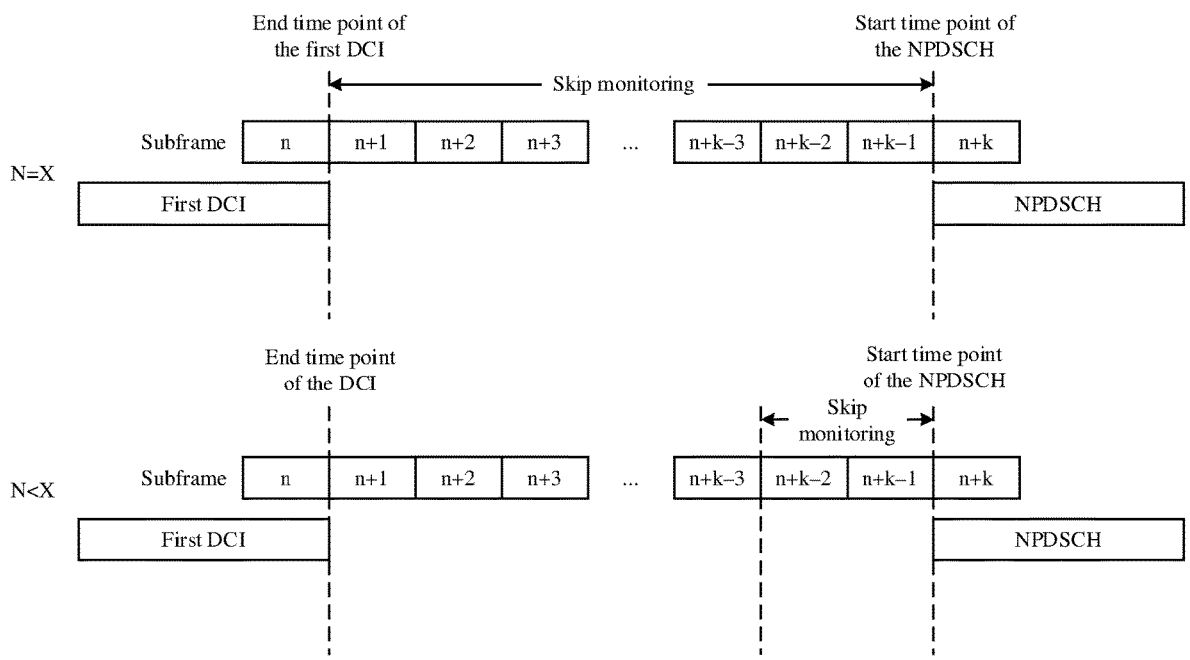
FIG. 8 is a schematic diagram of a timing requirement for downlink scheduling according to an embodiment of this application.

Specifically, the target time interval may include a time unit between a first time unit and a second time unit; the first time unit is a time unit in which transmission of the physical downlink control channel used to carry the first DCI ends; and the second time unit is a time unit in which transmission of a physical uplink shared channel or a physical downlink shared channel starts, where the physical uplink shared channel or the physical downlink shared channel is used to carry the 1$^{st}$ TB scheduled by the first DCI. In this case, the target time interval does not include the first time unit and the second time unit, but includes one or more time units between the first time unit and the second time unit. For example, the terminal device performs downlink transmission. As shown in FIG. 8, a subframe n is an end subframe of DCI; a subframe n+k is a start subframe of an NPDSCH scheduled by the DCI; the first time unit is the subframe n; the second time unit is the subframe n+k; and a target time interval is subframes between the subframe n and the subframe n+k, namely, a subframe n+1 to a subframe n+k−1. To be specific, the target time interval includes the subframe n+1, the subframe n+k−1 and one or more subframes between the subframe n+i and the subframe n+k−1.

Alternatively, the foregoing technical solution may be expressed as follows: When N=X, the target time interval includes a time unit between a first time unit and a second time unit. The first time unit is the 1$^{st}$ time unit after a time unit in which transmission of the physical downlink control channel used to carry the first DCI ends. The second time unit is the 1$^{st}$ time unit before a time unit in which transmission of a physical uplink shared channel or a physical downlink shared channel starts, where the physical uplink shared channel or the physical downlink shared channel is used to carry the 1$^{st}$ TB scheduled by the first DCI, or the uplink shared channel or the downlink shared channel is used to carry the N TBs scheduled by the first DCI. In this case, the target time interval includes the first time unit, the second time unit, and one or more time units between the first time unit and the second time unit. For example, the terminal device performs downlink transmission. As shown in FIG. 8, the first time unit is a subframe n+1; the second time unit is a subframe n+k−1; and a target time interval is the subframe n+1 to the subframe n+k−1. To be specific, the target time interval includes the subframe n+1, the subframe n+k−1, and one or more subframes between the subframe n+1 and the subframe n+k−1.

Alternatively, the foregoing technical solution may be expressed as follows: When N=X, a start moment of the target time interval is a moment at which transmission of the physical downlink control channel used to carry the first DCI ends, and an end moment of the target time interval is a moment at which transmission of a physical uplink shared channel or a physical downlink shared channel starts, where the physical uplink shared channel or the physical downlink shared channel is used to carry the 1$^{st}$ TB scheduled by the first DCI, or the uplink shared channel or the downlink shared channel is used to carry the N TBs scheduled by the first DCI. For example, the terminal device performs downlink transmission. As shown in FIG. 8, the start moment of the target time interval is an end time point of DCI; and the end moment of the target time interval is a start time point of an NPDSCH.

It should be understood that, in addition to carrying the 1$^{st}$ TB scheduled by the first DCI, the physical uplink shared channel or the physical downlink shared channel may further carry another TB. This is not specifically limited in this embodiment of this application. For example, the physical uplink shared channel or the physical downlink shared channel is used to carry the N TBs scheduled by the first DCI.

When N<X, to be specific, when the quantity of TBs scheduled by the first DCI is less than a preset quantity of HARQ processes, a maximum value of a quantity of TBs that can be scheduled by the DCI, or the first value, another TB may be transmitted between the terminal device and the network device. Therefore, after transmission of the first DCI ends, the network device may send other DCI to the terminal device, and the terminal device also needs to continue to monitor the physical downlink control channel.

Specifically, the target time interval includes a time unit between a third time unit and a second time unit; the third time unit is an M$^{th}$ time unit before transmission of a physical uplink shared channel or a physical downlink shared channel starts; and the second time unit is a time unit in which transmission of the physical uplink shared channel or the physical downlink shared channel starts, where the third time unit is after a time unit in which transmission of the physical downlink control channel used to carry the first DCI ends, the physical uplink shared channel or the physical downlink shared channel is transmitted after the physical downlink control channel used to carry the first DCI, and M is an integer greater than or equal to 2. In this case, the target time interval does not include the third time unit and the second time unit, but includes one or more time units between the third time unit and the second time unit. For example, the terminal device performs downlink transmission. As shown in FIG. 8, M=3, the third time unit is a subframe n+k−3; the second time unit is a subframe n+k; and a target time interval is a subframe n+k−2 to a subframe n+k−1. To be specific, the target time interval includes the subframe n+k−2 and the subframe n+k−1.

Alternatively, the foregoing technical solution may be expressed as follows: When N<X, the target time interval includes a time unit between a third time unit and a second time unit; the third time unit is an $M^{th}$ time unit before transmission of a physical uplink shared channel or a physical downlink shared channel starts; and the second time unit is a time unit previous to a time unit in which transmission of the physical uplink shared channel or the physical downlink shared channel starts, where the third time unit is after a time unit in which transmission of the physical downlink control channel used to carry the first DCI ends, the physical uplink shared channel or the physical downlink shared channel is transmitted after the physical downlink control channel used to carry the first DCI, and M is an integer greater than or equal to 1. In this case, the target time interval includes the third time unit, the second time unit, and one or more time units between the third time unit and the second time unit. For example, the terminal device performs downlink transmission. As shown in FIG. 8, M=2, the third time unit is a subframe n+k−2; the second time unit is a subframe n+k−1; and a target time interval is the subframe n+k−2 to the subframe n+k−1. To be specific, the target time interval includes the subframe n+k−2 and the subframe n+k−1.

It should be understood that the $M^{th}$ time unit before transmission of the physical uplink shared channel or the physical downlink shared channel starts may be understood as an $M^{th}$ time unit counted forward from the time unit in which transmission of the physical uplink shared channel or the physical downlink shared channel starts. A time unit that is before the time unit in which transmission of the physical uplink shared channel or the physical downlink shared channel starts and that is closest to the time unit in which transmission of the physical uplink shared channel or the physical downlink shared channel starts is the $1^{st}$ time unit before the time unit in which transmission of the physical uplink shared channel or the physical downlink shared channel starts.

It should be further understood that the physical uplink shared channel or the physical downlink shared channel may be scheduled by the first DCI or other DCI. This is not specifically limited in this embodiment of this application. Optionally, the physical uplink shared channel or the physical downlink shared channel is used to carry the $1^{st}$ TB scheduled by the first DCI.

It may be understood that the time unit may be a superframe, a frame, a half-frame, a subframe, a slot, a symbol, a sampling point, or the like. This is not specifically limited in this embodiment of this application.

Optionally, the method shown in FIG. 7 further includes 730. In 730, the network device sends, to the terminal device, the N TBs scheduled by the first DCI, and the terminal device receives, from the network device, the N TBs scheduled by the first DCI. Alternatively, the terminal device sends, to the network device, the N TBs scheduled by the first DCI, and the network device receives, from the terminal device, the N TBs scheduled by the first DCI. Specifically, for downlink transmission, the network device sends, to the terminal device, the N TBs scheduled by the first DCI. Correspondingly, in step 710, the first DCI received by the terminal device includes scheduling information of the N TBs, and the terminal device receives the N TBs based on the scheduling information. For uplink transmission, in step 710, the first DCI received by the terminal device includes scheduling information of the N TBs, and the terminal device sends, to the network device based on the scheduling information, the N TBs scheduled by the first DCI. Correspondingly, the network device receives the N TBs sent by the terminal device.

A time point at which the network device determines the target time interval is not limited in this embodiment of this application. For example, the network device may determine the target time interval before sending the first DCI, after sending the first DCI, or when sending the first DCI.

That the network device determines the first DCI before sending the first DCI to the terminal device includes determining the quantity of TBs scheduled by the first DCI. For example, the network device determines, based on an amount of to-be-transmitted data, the quantity of TBs scheduled by the first DCI.

In some embodiments, before the terminal device receives the first DCI sent by the network device, the network device may further send configuration information to the terminal device, and indicate, by using the configuration information, the terminal device to activate scheduling enhancement. The terminal device activates a scheduling enhancement feature after receiving the configuration information. It should be understood that scheduling enhancement indicates that one piece of DCI may schedule at least two TBs. In some cases, scheduling enhancement may alternatively be expressed as "scheduling a plurality of TBs", "scheduling a plurality of TBs by one piece of DCI", "scheduling a plurality of downlink TBs by one piece of DCI", "scheduling a plurality of uplink TBs by one piece of DCI", or the like.

Considering that a new DCI format is introduced due to the scheduling enhancement feature, if scheduling enhancement is used in a common search space (CSS), the network device needs to send DCI in two formats to a terminal device that supports the scheduling enhancement feature and a terminal device that does not support the scheduling enhancement feature, to transmit same data and schedule the data. This increases network resource overheads. The terminal device needs to blindly detect the DCI in two formats. This increases blind detection complexity. If scheduling enhancement is limited to be used in a UE-specific search space (USS), the foregoing problems of increasing resource overheads on a network device side and increasing blind detection complexity on a terminal device side can be avoided. That is, in a scheduling enhancement scenario, a search space corresponding to the DCI may be the USS.

Figure 9:
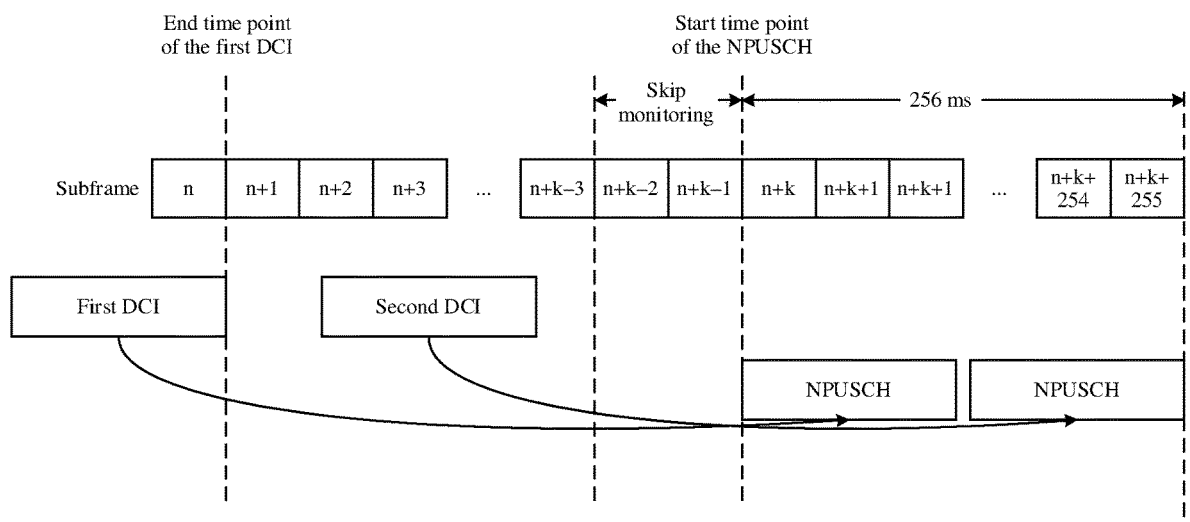
FIG. 9 is a schematic diagram of a timing requirement for scheduling two uplink HARQs.

In the Rel-14 NB-IoT, in a scenario in which two HARQs are configured, a value of a scheduling delay between the DCI and the physical uplink shared channel is limited, and a maximum value of the scheduling delay is 64 ms. Therefore, to avoid a transmission conflict between the DCI and the physical uplink shared channel, transmission duration of physical uplink shared channels cannot exceed 256 ms. As shown in FIG. 9, an end subframe of transmission of an NPUSCH scheduled by second DCI cannot be later than a subframe n+k+255. In other words, duration from a moment at which transmission of an NPUSCH scheduled by the first DCI starts to a moment at which transmission of the NPUSCH scheduled by the second DCI ends cannot exceed 256 milliseconds (ms). In a scenario in which one piece of DCI schedules a plurality of TBs, because the DCI can schedule the plurality of TBs, a scheduling delay can be redesigned. A maximum value of the scheduling delay may be increased or a meaning of the scheduling delay may be changed. For example, the scheduling delay indicates duration from a time point at which transmission of the DCI ends to a time point at which transmission of a downlink shared channel or an uplink shared channel that carries the 1$^{st}$ TB scheduled by the DCI starts, to avoid a transmission conflict between the DCI and a physical uplink shared channel. Therefore, a solution different from the foregoing solution may be used.

Similarly, the network device and the terminal device may determine, based on the value relationship between the quantity N of TBs scheduled by the first DCI and the first value, the total transmission duration of the physical uplink shared channels used to carry the N TBs.

A format of the physical uplink shared channel used in this embodiment of this application is not specifically limited. For example, the format may be an NPUSCH format 1 or an NPUSCH format 2.

Figure 10:
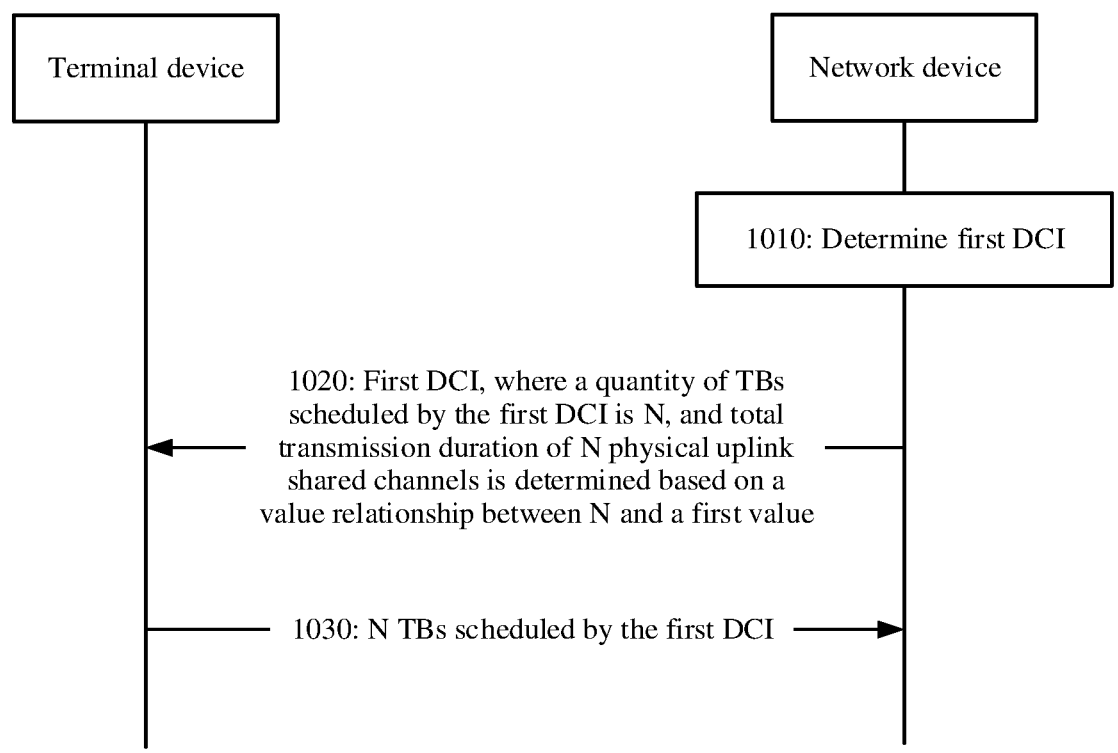
FIG. 10 is a schematic flowchart of an information transmission method according to another embodiment of this application.

FIG. 10 is a schematic flowchart of an information transmission method according to another embodiment of this application.

In 1010, that a network device determines first DCI includes determining a quantity N of TBs scheduled by the first DCI.

Optionally, the network device may determine, based on an amount of to-be-transmitted data and/or a remaining transmission resource, the quantity of TBs scheduled by the first DCI.

In 1020, the network device sends the first DCI to a terminal device, and the terminal device receives the first DCI sent by the network device, where the quantity of TBs scheduled by the first DCI is N, total transmission duration of N physical uplink shared channels scheduled by the first DCI is determined based on a value relationship between N and a first value, the N physical uplink shared channels are used to carry the N TBs scheduled by the first DCI, and N is an integer greater than or equal to 1.

Optionally, the transmission duration is duration from a fourth time unit to a fifth time unit. The fourth time unit is a time unit in which transmission of a physical uplink shared channel used to carry the 1$^{st}$ TB in the N TBs starts, and the fifth time unit is a time unit in which transmission of a physical uplink shared channel used to carry the last TB in the N TBs ends. In this case, the transmission duration includes the fourth time unit and the fifth time unit. For example, a time unit in which transmission of a physical uplink shared channel used to carry a TB scheduled by the first DCI starts is a subframe n+k, and a time unit in which transmission of a physical uplink shared channel used to carry a TB scheduled by second DCI ends is a subframe n+k+m, and the transmission duration is (m+i) subframes.

Figure 11:
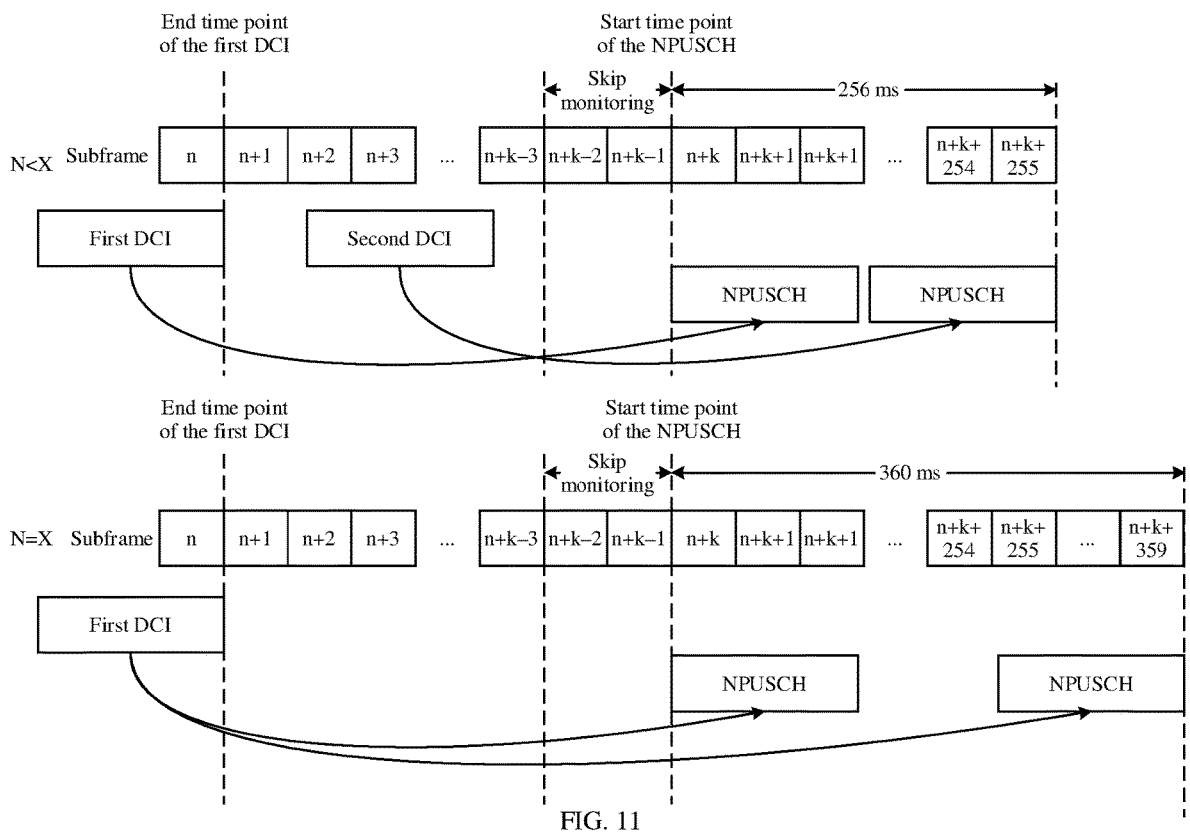
FIG. 11 is a schematic diagram of a timing requirement for uplink scheduling according to an embodiment of this application.

When N=X, it indicates that the network device no longer sends DCI during this scheduling, so that the foregoing transmission conflict does not occur. Therefore, a limitation that the transmission duration of the physical uplink shared channels cannot exceed 256 ms can be canceled. In other words, when N=X, the transmission duration of the physical uplink shared channels may not be limited to 256 ms. In an actual case, the transmission duration of the physical uplink shared channels used to carry the N TBs scheduled by the first DCI may be greater than, equal to, or less than 256 ms. For example, X=2. As shown in FIG. 11, when N=2, the network device no longer sends the second DCI, and two NPUSCHs scheduled by the first DCI are transmitted in duration from a subframe n+k to a subframe n+k+359. The total transmission duration is 360 ms, which is greater than 256 ms.

When N<X, it indicates that the network device may continue to send DCI, and the transmission duration of the physical uplink shared channels still needs to be less than or equal to 256 ms, so that data can be correctly transmitted. In other words, when the network device sends the second DCI to the terminal device in a time segment different from a target time interval, duration from the time unit in which transmission of the physical uplink shared channel used to carry the TB scheduled by the second DCI ends to the time unit in which transmission of the physical uplink shared channel used to carry the TB scheduled by the first DCI starts is less than or equal to 256 milliseconds. For example, X=2. As shown in FIG. 11, when N=1, the network device sends the second DCI, and total transmission duration of an NPUSCH scheduled by the first DCI and an NPUSCH scheduled by the second DCI is less than or equal to 256 ms. That is, the NPUSCH scheduled by the first DCI and the NPUSCH scheduled by the second DCI are transmitted in duration from a subframe n+k to a subframe n+k+255.

In 1030, the terminal device sends, to the network device, the N TBs scheduled by the first DCI, and the network device receives, from the terminal device, the N TBs scheduled by the first DCI. Specifically, in 1020, the first DCI received by the terminal device includes scheduling information of the N TBs, and the terminal device sends, to the network device based on the scheduling information, the N TBs scheduled by the first DCI. Correspondingly, the network device receives the N TBs sent by the terminal device.

It may be understood that the method shown in FIG. 7 and the method shown in FIG. 10 may be implemented separately, or may be implemented in combination. This is not specifically limited in this embodiment of this application.

The following describes apparatus embodiments of this application with reference to FIG. 12 to FIG. 19. It should be understood that the apparatus embodiments of this application and the method embodiments of this application correspond to each other. For similar descriptions, refer to the method embodiments. It should be noted that the apparatus embodiments may be used in conjunction with the foregoing method embodiments, or may be independently used.

Figure 12:
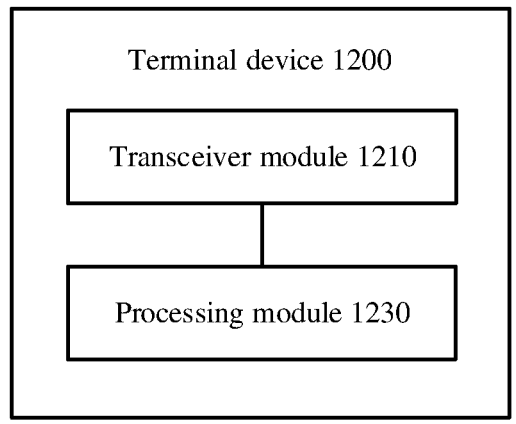
FIG. 12 is a schematic diagram of a structure of a terminal device according to an embodiment of this application.

FIG. 12 is a schematic diagram of a structure of a terminal device according to an embodiment of this application. A terminal device 1200 shown in FIG. 12 may correspond to the foregoing terminal device. As shown in FIG. 12, the terminal device 1200 includes a transceiver module 1210 and a processing module 1230.

The transceiver module 1210 is configured to receive first downlink control information DCI sent by a network device, where a quantity of transport blocks TBs scheduled by the first DCI is N, and N is an integer greater than or equal to 1.

The processing module 1230 is configured to control the transceiver module 1210 to skip monitoring a physical downlink control channel in a target time interval, where the target time interval is determined based on a value relationship between N and a first value.

Optionally, the transceiver module 1210 is further configured to: receive, from the network device, the N TBs scheduled by the first DCI; or send, to the network device, the N TBs scheduled by the first DCI.

Optionally, when N is equal to the first value, the target time interval includes a time unit between a first time unit and a second time unit; the first time unit is a time unit in which transmission of a physical downlink control channel used to carry the first DCI ends; and the second time unit is a time unit in which transmission of a physical uplink shared channel or a physical downlink shared channel starts, where the physical uplink shared channel or the physical downlink shared channel is used to carry the $1^{st}$ TB scheduled by the first DCI, or the uplink shared channel or the downlink shared channel is used to carry the N TBs scheduled by the first DCI. In this case, the target time interval does not include the first time unit and the second time unit, but includes one or more time units between the first time unit and the second time unit.

It may be understood that the time unit may be a superframe, a frame, a half-frame, a subframe, a slot, a symbol, a sampling point, or the like.

Optionally, when N is equal to the first value, transmission duration of physical uplink shared channels used to carry the N TBs scheduled by the first DCI is greater than 256 milliseconds. Optionally, the transmission duration is duration from a fourth time unit to a fifth time unit. The fourth time unit is a time unit in which transmission of a physical uplink shared channel used to carry the $1^{st}$ TB in the N TBs starts, and the fifth time unit is a time unit in which transmission of a physical uplink shared channel used to carry the last TB in the N TBs ends. In this case, the transmission duration includes the fourth time unit and the fifth time unit.

It may be understood that, when N is equal to the first value, the transmission duration of the physical uplink shared channels may not be limited to 256 ms. Therefore, in an actual case, the transmission duration of the physical uplink shared channels used to carry the N TBs scheduled by the first DCI may be greater than, equal to, or less than 256 ms.

Optionally, when N is less than the first value, the target time interval includes a time unit between a third time unit and a second time unit; the third time unit is an $M^{th}$ time unit before transmission of a physical uplink shared channel or a physical downlink shared channel starts; and the second time unit is a time unit in which transmission of the physical uplink shared channel or the physical downlink shared channel starts, where the third time unit is after a time unit in which transmission of a physical downlink control channel used to carry the first DCI ends, the physical uplink shared channel or the physical downlink shared channel is transmitted after the physical downlink control channel used to carry the first DCI, and M is an integer greater than or equal to 2. In this case, the target time interval does not include the third time unit and the second time unit, but includes one or more time units between the third time unit and the second time unit.

It may be understood that the time unit may be a superframe, a frame, a half-frame, a subframe, a slot, a symbol, a sampling point, or the like.

Optionally, when N is less than the first value, the transceiver module 1210 is further configured to receive second DCI sent by the network device, where duration from a time unit in which transmission of a physical uplink shared channel used to carry a TB scheduled by the second DCI ends to a time unit in which transmission of a physical uplink shared channel used to carry a TB scheduled by the first DCI starts is less than or equal to 256 milliseconds. Optionally, the transmission duration is duration from a fourth time unit to a fifth time unit. The fourth time unit is a time unit in which transmission of a physical uplink shared channel used to carry the $1^{st}$ TB in the N TBs starts, and the fifth time unit is a time unit in which transmission of a physical uplink shared channel used to carry the last TB in the N TBs ends. In this case, the transmission duration includes the fourth time unit and the fifth time unit.

Optionally, the first value is a preset value, or is determined by the network device.

Optionally, before receiving the first DCI sent by the network device, the transceiver module 1210 is further configured to receive configuration information sent by the network device, where the configuration information is used to activate scheduling enhancement.

It should be understood that scheduling enhancement may alternatively be expressed as "scheduling a plurality of TBs", "scheduling a plurality of TBs by one piece of DCI", "scheduling a plurality of downlink TBs by one piece of DCI", "scheduling a plurality of uplink TBs by one piece of DCI", or the like.

Optionally, a search space corresponding to the first DCI is a UE-specific search space USS.

Optionally, the first value is a maximum value of a quantity of TBs that can be scheduled by one piece of DCI.

The transceiver module 1210 may be implemented by a transceiver. The processing module 1230 may be implemented by a processor. For specific functions and beneficial effects of the transceiver module 1210 and the processing module 1230, refer to the method shown in FIG. 7. Details are not described herein again.

Figure 13:
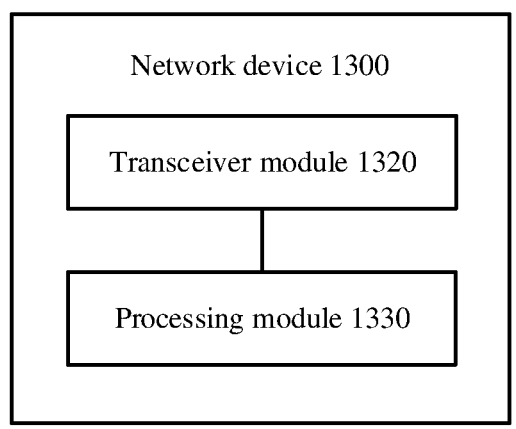
FIG. 13 is a schematic diagram of a structure of a network device according to an embodiment of this application.

FIG. 13 is a schematic diagram of a structure of a network device according to an embodiment of this application. A network device 1300 shown in FIG. 13 may correspond to the foregoing network device. As shown in FIG. 13, the network device 1300 includes a transceiver module 1320 and a processing module 1330.

The transceiver module 1320 is configured to send first downlink control information DCI to a terminal device, where a quantity of transport blocks TBs scheduled by the first DCI is N, and N is an integer greater than or equal to 1.

The processing module 1330 is configured to control the transceiver module 1320 to skip sending DCI in a target time interval, where the target time interval is determined based on a value relationship between N and a first value.

The transceiver module 1320 is further configured to: send, to the terminal device, the N TBs scheduled by the first DCI; or receive, from the terminal device, the N TBs scheduled by the first DCI.

Optionally, when N is equal to the first value, the target time interval includes a time unit between a first time unit and a second time unit; the first time unit is a time unit in which transmission of a physical downlink control channel used to carry the first DCI ends; and the second time unit is a time unit in which transmission of a physical uplink shared channel or a physical downlink shared channel starts, where the physical uplink shared channel or the physical downlink shared channel is used to carry the $1^{st}$ TB scheduled by the first DCI, or the uplink shared channel or the downlink shared channel is used to carry the N TBs scheduled by the first DCI. In this case, the target time interval does not include the first time unit and the second time unit, but includes one or more time units between the first time unit and the second time unit.

Optionally, when N is equal to the first value, transmission duration of physical uplink shared channels used to carry the N TBs scheduled by the first DCI is greater than 256 milliseconds. Optionally, the transmission duration is duration from a fourth time unit to a fifth time unit. The fourth time unit is a time unit in which transmission of a physical uplink shared channel used to carry the $1^{st}$ TB in the N TBs starts, and the fifth time unit is a time unit in which transmission of a physical uplink shared channel used to carry the last TB in the N TBs ends. In this case, the transmission duration includes the fourth time unit and the fifth time unit.

It may be understood that, when N is equal to the first value, the transmission duration of the physical uplink shared channels may not be limited to 256 ms. Therefore, in an actual case, the transmission duration of the physical uplink shared channels used to carry the N TBs scheduled by the first DCI may be greater than, equal to, or less than 256 ms.

Optionally, when N is less than the first value, the target time interval includes a time unit between a third time unit and a second time unit; the third time unit is an $M^{th}$ time unit before transmission of a physical uplink shared channel or a physical downlink shared channel starts; and the second time unit is a time unit in which transmission of the physical uplink shared channel or the physical downlink shared channel starts, where the third time unit is after a time unit in which transmission of a physical downlink control channel used to carry the first DCI ends, the physical uplink shared channel or the physical downlink shared channel is transmitted after the physical downlink control channel used to carry the first DCI, and M is an integer greater than or equal to 2. In this case, the target time interval does not include the third time unit and the second time unit, but includes one or more time units between the third time unit and the second time unit.

It may be understood that the time unit may be a superframe, a frame, a half-frame, a subframe, a slot, a symbol, a sampling point, or the like. Optionally, when N is less than the first value, the transceiver module 1320 is further configured to send second DCI to the terminal device, where duration from a time unit in which transmission of a physical uplink shared channel used to carry a TB scheduled by the second DCI ends to a time unit in which transmission of a physical uplink shared channel used to carry a TB scheduled by the first DCI starts is less than or equal to 256 milliseconds. Optionally, the transmission duration is duration from a fourth time unit to a fifth time unit. The fourth time unit is a time unit in which transmission of a physical uplink shared channel used to carry the $1^{st}$ TB in the N TBs starts, and the fifth time unit is a time unit in which transmission of a physical uplink shared channel used to carry the last TB in the N TBs ends. In this case, the transmission duration includes the fourth time unit and the fifth time unit.

Optionally, the first value is a preset value, or is determined by the network device.

Optionally, before sending the first DCI to the terminal device, the transceiver module 1320 is further configured to send configuration information to the terminal device, where the configuration information is used to activate scheduling enhancement.

It should be understood that scheduling enhancement may alternatively be expressed as "scheduling a plurality of TBs", "scheduling a plurality of TBs by one piece of DCI", "scheduling a plurality of downlink TBs by one piece of DCI", "scheduling a plurality of uplink TBs by one piece of DCI", or the like.

Optionally, a search space corresponding to the first DCI is a UE-specific search space USS.

Optionally, the first value is a maximum value of a quantity of TBs that can be scheduled by one piece of DCI.

The transceiver module 1320 may be implemented by a transceiver. The processing module 1330 may be implemented by a processor. For specific functions and beneficial effects of the transceiver module 1320 and the processing module 1330, refer to the method shown in FIG. 7. Details are not described herein again.

Figure 14:
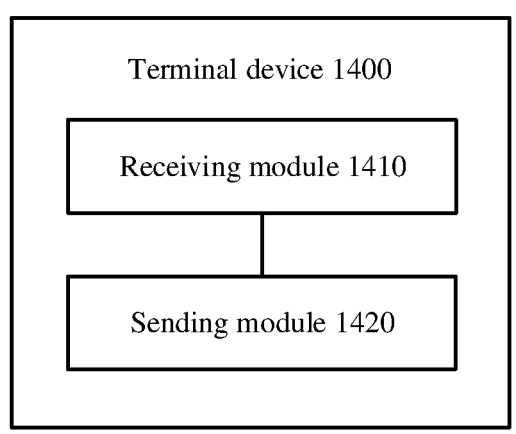
FIG. 14 is a schematic diagram of a structure of a terminal device according to another embodiment of this application.

FIG. 14 is a schematic diagram of a structure of a terminal device according to another embodiment of this application. A terminal device 1400 shown in FIG. 14 may correspond to the foregoing terminal device. As shown in FIG. 14, the terminal device 1400 includes a receiving module 1410 and a sending module 1420.

The receiving module 1410 is configured to receive first downlink control information DCI sent by a network device, where a quantity of transport blocks TBs scheduled by the first DCI is N, total transmission duration of N physical uplink shared channels scheduled by the first DCI is determined based on a value relationship between N and a first value, the N physical uplink shared channels are used to carry the N TBs scheduled by the first DCI, and N is an integer greater than or equal to 1.

The sending module 1420 is configured to send, to the network device, the N TBs scheduled by the first DCI.

Optionally, the terminal device skips monitoring a physical downlink control channel in a target time interval, where the target time interval is determined based on the value relationship.

Optionally, when N is equal to the first value, the transmission duration is greater than 256 milliseconds. Optionally, the transmission duration is duration from a fourth time unit to a fifth time unit. The fourth time unit is a time unit in which transmission of a physical uplink shared channel used to carry the $1^{st}$ TB in the N TBs starts, and the fifth time unit is a time unit in which transmission of a physical uplink shared channel used to carry the last TB in the N TBs ends. In this case, the transmission duration includes the fourth time unit and the fifth time unit.

It may be understood that, when N is equal to the first value, the transmission duration of the physical uplink shared channels may not be limited to 256 ms. Therefore, in an actual case, the transmission duration of the physical uplink shared channels used to carry the N TBs scheduled by the first DCI may be greater than, equal to, or less than 256 ms.

Optionally, when N is equal to the first value, the target time interval includes a time unit between a first time unit and a second time unit; the first time unit is a time unit in which transmission of a physical downlink control channel used to carry the first DCI ends; and the second time unit is a time unit in which transmission of a physical uplink shared channel or a physical downlink shared channel starts, where the physical uplink shared channel or the physical downlink shared channel is used to carry the $1^{st}$ TB scheduled by the first DCI, or the uplink shared channel or the downlink shared channel is used to carry the N TBs scheduled by the first DCI. In this case, the target time interval does not include the first time unit and the second time unit, but includes one or more time units between the first time unit and the second time unit.

It may be understood that the time unit may be a superframe, a frame, a half-frame, a subframe, a slot, a symbol, a sampling point, or the like.

Optionally, when N is less than the first value, the receiving module 1410 is further configured to receive second DCI sent by the network device, where duration from a time unit in which transmission of a physical uplink shared channel used to carry a TB scheduled by the second DCI ends to a time unit in which transmission of a physical uplink shared channel used to carry a TB scheduled by the first DCI starts is less than or equal to 256 milliseconds. Optionally, the transmission duration is duration from a fourth time unit to a fifth time unit. The fourth time unit is a time unit in which transmission of a physical uplink shared channel used to carry the $1^{st}$ TB in the N TBs starts, and the fifth time unit is a time unit in which transmission of a physical uplink shared channel used to carry the last TB in the N TBs ends. In this case, the transmission duration includes the fourth time unit and the fifth time unit.

Optionally, when N is less than the first value, the target time interval includes a time unit between a third time unit and a second time unit; the third time unit is an $M^{th}$ time unit before transmission of a physical uplink shared channel or a physical downlink shared channel starts; and the second time unit is a time unit in which transmission of the physical uplink shared channel or the physical downlink shared channel starts, where the third time unit is after a time unit in which transmission of a physical downlink control channel used to carry the first DCI ends, the physical uplink shared channel or the physical downlink shared channel is transmitted after the physical downlink control channel used to carry the first DCI, and M is an integer greater than or equal to 2. In this case, the target time interval does not include the third time unit and the second time unit, but includes one or more time units between the third time unit and the second time unit.

It may be understood that the time unit may be a superframe, a frame, a half-frame, a subframe, a slot, a symbol, a sampling point, or the like.

Optionally, the first value is a preset value, or is determined by the network device.

Optionally, before receiving the first DCI sent by the network device, the receiving module 1410 is further configured to receive configuration information sent by the network device, where the configuration information is used to activate scheduling enhancement.

Optionally, a search space corresponding to the first DCI is a UE-specific search space USS.

Optionally, the first value is a maximum value of a quantity of TBs that can be scheduled by one piece of DCI.

The receiving module 1410 and the sending module 1420 may be implemented by a transceiver. For specific functions and beneficial effects of the receiving module 1410 and the sending module 1420, refer to the method shown in FIG. 10. Details are not described herein again.

Figure 15:
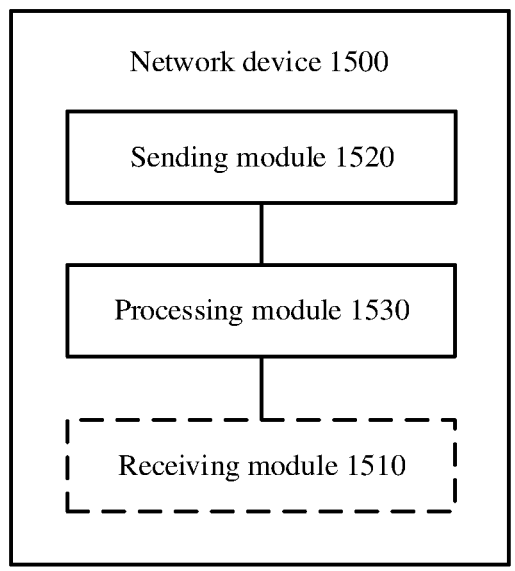
FIG. 15 is a schematic diagram of a structure of a network device according to another embodiment of this application.

FIG. 15 is a schematic diagram of a structure of a network device according to another embodiment of this application. A network device 1500 shown in FIG. 15 may correspond to the foregoing network device. As shown in FIG. 15, the network device 1500 includes a sending module 1520 and a processing module 1530.

The processing module 1530 is configured to determine first downlink control information DCI.

The sending module 1520 is configured to send the first DCI to a terminal device, where a quantity of transport blocks TBs scheduled by the first DCI is N, total transmission duration of N physical uplink shared channels scheduled by the first DCI is determined based on a value relationship between N and a first value, the N physical uplink shared channels are used to carry the N TBs scheduled by the first DCI, and N is an integer greater than or equal to 1.

Optionally, the network device 1500 further includes a receiving module 1510, configured to send, from the terminal device, the N TBs scheduled by the first DCI.

Optionally, the network device skips sending DCI in a target time interval, where the target time interval is determined based on the value relationship.

Optionally, when N is equal to the first value, the transmission duration is greater than 256 milliseconds. Optionally, the transmission duration is duration from a fourth time unit to a fifth time unit. The fourth time unit is a time unit in which transmission of a physical uplink shared channel used to carry the $1^{st}$ TB in the N TBs starts, and the fifth time unit is a time unit in which transmission of a physical uplink shared channel used to carry the last TB in the N TBs ends. In this case, the transmission duration includes the fourth time unit and the fifth time unit.

It may be understood that, when N is equal to the first value, the transmission duration of the physical uplink shared channels may not be limited to 256 ms. Therefore, in an actual case, the transmission duration of the physical uplink shared channels used to carry the N TBs scheduled by the first DCI may be greater than, equal to, or less than 256 ms.

Optionally, when N is equal to the first value, the target time interval includes a time unit between a first time unit and a second time unit; the first time unit is a time unit in which transmission of a physical downlink control channel used to carry the first DCI ends; and the second time unit is a time unit in which transmission of a physical uplink shared channel or a physical downlink shared channel starts, where the physical uplink shared channel or the physical downlink shared channel is used to carry the $1^{st}$ TB scheduled by the first DCI, or the uplink shared channel or the downlink shared channel is used to carry the N TBs scheduled by the first DCI. In this case, the target time interval does not include the first time unit and the second time unit, but includes one or more time units between the first time unit and the second time unit.

It may be understood that the time unit may be a superframe, a frame, a half-frame, a subframe, a slot, a symbol, a sampling point, or the like.

Optionally, when N is less than the first value, the sending module 1520 is further configured to send second DCI to the terminal device, where duration from a time unit in which transmission of a physical uplink shared channel used to carry a TB scheduled by the second DCI ends to a time unit in which transmission of a physical uplink shared channel used to carry a TB scheduled by the first DCI starts is less than or equal to 256 milliseconds. Optionally, the transmission duration is duration from a fourth time unit to a fifth time unit. The fourth time unit is a time unit in which transmission of a physical uplink shared channel used to carry the $1^{st}$ TB in the N TBs starts, and the fifth time unit is a time unit in which transmission of a physical uplink shared channel used to carry the last TB in the N TBs ends. In this case, the transmission duration includes the fourth time unit and the fifth time unit.

Optionally, when N is less than the first value, the target time interval includes a time unit between a third time unit and a second time unit; the third time unit is an $M^{th}$ time unit before transmission of a physical uplink shared channel or a physical downlink shared channel starts; and the second time unit is a time unit in which transmission of the physical uplink shared channel or the physical downlink shared channel starts, where the third time unit is after a time unit in which transmission of a physical downlink control channel used to carry the first DCI ends, the physical uplink shared channel or the physical downlink shared channel is transmitted after the physical downlink control channel used to carry the first DCI, and M is an integer greater than or equal to 2. In this case, the target time interval does not include the third time unit and the second time unit, but includes one or more time units between the third time unit and the second time unit.

It may be understood that the time unit may be a superframe, a frame, a half-frame, a subframe, a slot, a symbol, a sampling point, or the like.

Optionally, the first value is a preset value, or is determined by the network device.

Optionally, before sending the first DCI to the terminal device, the sending module 1520 is further configured to send configuration information to the terminal device, where the configuration information is used to activate scheduling enhancement.

Optionally, a search space corresponding to the first DCI is a UE-specific search space USS.

Optionally, the first value is a maximum value of a quantity of TBs that can be scheduled by one piece of DCI.

The receiving module 1510 and the sending module 1520 may be implemented by a transceiver. The processing module 1530 may be implemented by a processor. For specific functions and beneficial effects of the receiving module 1510, the sending module 1520, and the processing module 1530, refer to the method shown in FIG. 10. Details are not described herein again.

Figure 16:
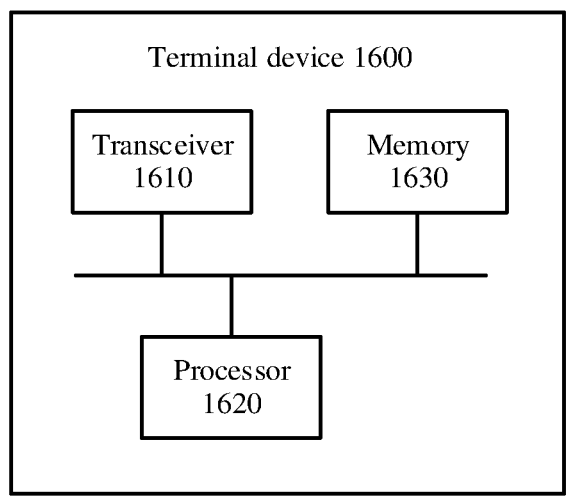
FIG. 16 is a schematic diagram of a structure of a terminal device according to another embodiment of this application.

FIG. 16 is a schematic diagram of a structure of a terminal device according to another embodiment of this application. As shown in FIG. 16, a terminal device 1600 may include a transceiver 1610, a processor 1620, and a memory 1630.

FIG. 16 shows only one memory and one processor. In an actual terminal device product, there may be one or more processors and one or more memories. The memory may also be referred to as a storage medium, a storage device, or the like. The memory may be disposed independently of the processor, or may be integrated with the processor. This is not limited in this embodiment of this application.

The transceiver 1610, the processor 1620, and the memory 1630 communicate with each other over an internal connection channel, to transfer a control signal and/or a data signal.

Specifically, the transceiver 1610 is configured to receive first downlink control information DCI sent by a network device, where a quantity of transport blocks TBs scheduled by the first DCI is N, and N is an integer greater than or equal to 1.

The processor 1620 is configured to control the transceiver 1610 to skip monitoring a physical downlink control channel in a target time interval, where the target time interval is determined based on a value relationship between N and a first value.

The transceiver 1610 is further configured to: receive, from the network device, the N TBs scheduled by the first DCI; or send, to the network device, the N TBs scheduled by the first DCI.

For a specific working process and beneficial effects of the terminal device 1600, refer to the descriptions in the embodiment shown in FIG. 7. Details are not described herein again.

Figure 17:
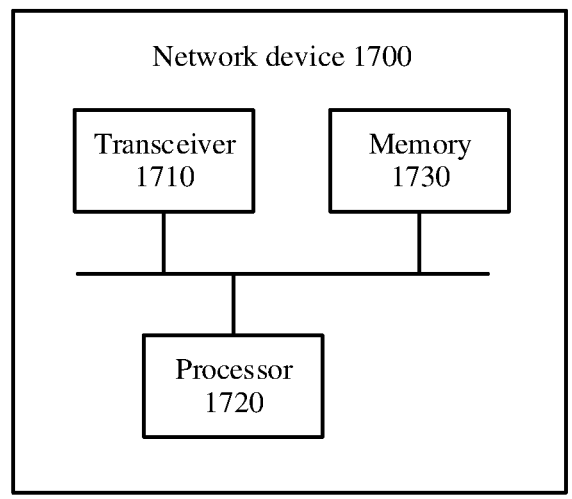
FIG. 17 is a schematic diagram of a structure of a network device according to another embodiment of this application.

FIG. 17 is a schematic diagram of a structure of a network device according to another embodiment of this application. As shown in FIG. 17, a network device 1700 may include a transceiver 1710, a processor 1720, and a memory 1730.

FIG. 17 shows only one memory and one processor. In an actual network device product, there may be one or more processors and one or more memories. The memory may also be referred to as a storage medium, a storage device, or the like. The memory may be disposed independently of the processor, or may be integrated with the processor. This is not limited in this embodiment of this application.

The transceiver 1710, the processor 1720, and the memory 1730 communicate with each other over an internal connection channel, to transfer a control signal and/or a data signal.

Specifically, the transceiver 1710 is configured to send first downlink control information DCI to a terminal device, where a quantity of transport blocks TBs scheduled by the first DCI is N, and N is an integer greater than or equal to 1.

The processor 1720 is configured to control the transceiver 1710 to skip sending DCI in a target time interval, where the target time interval is determined based on a value relationship between N and a first value.

The transceiver 1710 is further configured to: send, to the terminal device, the N TBs scheduled by the first DCI; or receive, from the terminal device, the N TBs scheduled by the first DCI.

For a specific working process and beneficial effects of the network device 1700, refer to the descriptions in the embodiment shown in FIG. 7. Details are not described herein again.

Figure 18:
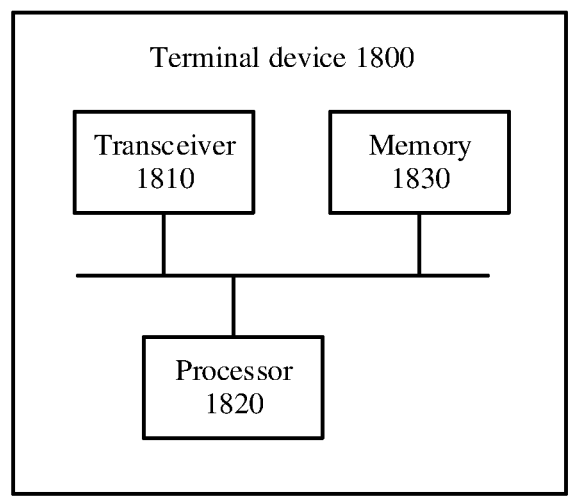
FIG. 18 is a schematic diagram of a structure of a terminal device according to another embodiment of this application.

FIG. 18 is a schematic diagram of a structure of a terminal device according to another embodiment of this application. As shown in FIG. 18, a terminal device 1800 may include a transceiver 1810, a processor 1820, and a memory 1830.

FIG. 18 shows only one memory and one processor. In an actual terminal device product, there may be one or more processors and one or more memories. The memory may also be referred to as a storage medium, a storage device, or the like. The memory may be disposed independently of the processor, or may be integrated with the processor. This is not limited in this embodiment of this application.

The transceiver 1810, the processor 1820, and the memory 1830 communicate with each other over an internal connection channel, to transfer a control signal and/or a data signal.

Specifically, the transceiver 1810 is configured to: receive first downlink control information DCI sent by a network device, where a quantity of transport blocks TBs scheduled by the first DCI is N, total transmission duration of N physical uplink shared channels scheduled by the first DCI is determined based on a value relationship between N and a first value, the N physical uplink shared channels are used to carry the N TBs scheduled by the first DCI, and N is an integer greater than or equal to 1; and send, to the network device, the N TBs scheduled by the first DCI.

For a specific working process and beneficial effects of the terminal device 1800, refer to the descriptions in the embodiment shown in FIG. 10. Details are not described herein again.

Figure 19:
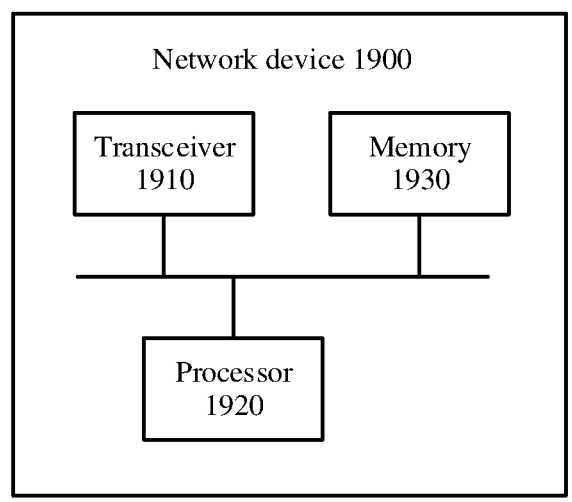
FIG. 19 is a schematic diagram of a structure of a network device according to another embodiment of this application.

FIG. 19 is a schematic diagram of a structure of a network device according to another embodiment of this application. As shown in FIG. 19, a network device 1900 may include a transceiver 1910, a processor 1920, and a memory 1930.

FIG. 19 shows only one memory and one processor. In an actual network device product, there may be one or more processors and one or more memories. The memory may also be referred to as a storage medium, a storage device, or the like. The memory may be disposed independently of the processor, or may be integrated with the processor. This is not limited in this embodiment of this application.

The transceiver 1910, the processor 1920, and the memory 1930 communicate with each other over an internal connection channel, to transfer a control signal and/or a data signal.

Specifically, the processor 1920 is configured to determine first downlink control information DCI.

The transceiver 1910 is configured to: send the first DCI to a terminal device, where a quantity of transport blocks TBs scheduled by the first DCI is N, total transmission duration of N physical uplink shared channels scheduled by the first DCI is determined based on a value relationship between N and a first value, the N physical uplink shared channels are used to carry the N TBs scheduled by the first DCI, and N is an integer greater than or equal to 1; and receive, from the terminal device, the N TBs scheduled by the first DCI.

For a specific working process and beneficial effects of the network device 1900, refer to the descriptions in the embodiment shown in FIG. 10. Details are not described herein again.

The transceiver in the embodiments of this application may also be referred to as a transceiver unit, a transceiver apparatus, or the like. The processor may also be referred to as a processing unit, a processing board, a processing module, a processing apparatus, or the like. Optionally, a component that is in the transceiver and that is configured to implement a receiving function may be considered as a receiving unit, and a component that is in the transceiver and that is configured to implement a sending function may be considered as a sending unit. In other words, the transceiver includes the receiving unit and the sending unit. The receiving unit may also be sometimes referred to as a receiver, a receiver, a receiving circuit, or the like. The sending unit may also be sometimes referred to as a transmitter, a transmitter, a transmitting circuit, or the like.

The memory in the embodiments of this application is configured to store computer instructions and a parameter for running the processor.

The processor in the embodiments of this application may be an integrated circuit chip, and has a signal processing capability. In an implementation process, the steps in the foregoing methods may be completed by using a hardware integrated logic circuit in the processor or instructions in a form of software. The processor in the embodiments of this application may be a general-purpose processor, a digital signal processor (DSP), an application-specific integrated circuit (application specific integrated circuit, ASIC), a field programmable gate array (FPGA) or another programmable logic device, a discrete gate or transistor logic device, or a discrete hardware component. The processor may implement or perform the methods, the steps, and logical block diagrams that are disclosed in the embodiments of this application. The general-purpose processor may be a microprocessor, or the processor may be any conventional processor or the like. The steps in the methods disclosed with reference to the embodiments of this application may be directly performed and completed through a hardware decoding processor, or may be performed and completed through a combination of hardware in the decoding processor and a software module. The software module may be located in a mature storage medium in the aft, such as a random access memory (RAM), a flash memory, a read-only memory (ROM), a programmable read-only memory, an electrically erasable programmable memory, or a register. The storage medium is located in the memory, and a processor reads instructions in the memory and completes the steps in the foregoing methods in combination with hardware of the processor.

It should be understood that division of manners, cases, types, and embodiments in the embodiments of this application are merely for ease of description, but should not constitute any special limitation, and features in various manners, types, cases, and embodiments may be combined when there is no contradiction.

It should be noted that the terms "first", "second", and "third" in the embodiments of this application are merely used for distinguishing, and should not be construed as any limitation on this application.

It should be further noted that, in the embodiments of this application, "preset" or "preconfiguration" may be implemented by pre-storing corresponding code or a corresponding table in a device (for example, including the terminal device or the network device) or in another manner that can be used to indicate related information. A specific implementation of "preset" or "preconfiguration" is not limited in this application.

It should be further noted that the terms "system" and "network" in this application may be used interchangeably in this specification. The term "and/or" in this application describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

Sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

In addition, aspects or features of this application may be implemented as a method, an apparatus, or a product that uses standard programming and/or engineering technologies. The term "product" used in this application covers a computer program that can be accessed from any computer-readable component, carrier or medium. For example, a computer-readable medium may include but is not limited to: a magnetic storage component (for example, a hard disk, a floppy disk, or a magnetic tape), an optical disc (for example, a compact disc (CD) or a digital versatile disc (DVD)), or a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, include, and/or carry instructions and/or data.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in another manner. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate. Parts displayed as units may or may not be physical units, to be specific, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for indicating a computer device (which may be a personal computer, a server, or a network device) to perform all or some of the steps in the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
   receiving, by a terminal device, first downlink control information (DCI) from a network device, wherein the first DCI schedules one or more transport blocks (TBs), a quantity of the one or more TBs is N, and N is an integer greater than or equal to 1; and
   skipping monitoring, by the terminal device, a physical downlink control channel in a target time interval, the target time interval being based on a relationship between N and a first value; and
   wherein when N is equal to the first value, a transmission duration of a physical uplink shared channel used to carry the one or more TBs scheduled by the first DCI is greater than 256 milliseconds.

2. The method according to claim 1, wherein when N is equal to the first value, the target time interval comprises a time unit between a first time unit and a second time unit; the first time unit is a time unit in which transmission of a physical downlink control channel used to carry the first DCI ends; and the second time unit is a time unit in which transmission of the physical uplink shared channel or a physical downlink shared channel starts, wherein the physical uplink shared channel or the physical downlink shared channel is used to carry the one or more TBs scheduled by the first DCI.

3. The method according to claim 1, wherein when N is less than the first value, the target time interval comprises a time unit between a third time unit and a second time unit; the third time unit is an Mth time unit before transmission of the physical uplink shared channel or a physical downlink shared channel starts; and the second time unit is a time unit in which the transmission of the physical uplink shared channel or the physical downlink shared channel starts, wherein the third time unit is after a time unit in which transmission of a physical downlink control channel used to carry the first DCI ends, the physical uplink shared channel or the physical downlink shared channel is transmitted after the physical downlink control channel used to carry the first DCI, and M is an integer greater than or equal to 2.

4. The method according to claim 1, wherein when N is less than the first value, the method further comprises:
   receiving, by the terminal device, second DCI from the network device, wherein a duration from a time unit in which transmission of a physical uplink shared channel used to carry a TB scheduled by the second DCI ends to a time unit in which transmission of the physical uplink shared channel used to carry the one or more TBs scheduled by the first DCI starts is less than or equal to 256 milliseconds.

5. The method according to claim 1, wherein the first value is a maximum quantity of TBs that is schedulable by one piece of DCI.

6. A method comprising:
   sending, by a network device, first downlink control information (DCI) to a terminal device, wherein the first DCI schedules one or more transport blocks (TBs), a quantity of the one or more TBs is N and N is an integer greater than or equal to 1; and
   skipping sending, by the network device, DCI in a target time interval, the target time interval being based on a relationship between N and a first value; and
   wherein when N is equal to the first value, a transmission duration of a physical uplink shared channel used to carry the one or more TBs scheduled by the first DCI is greater than 256 milliseconds.

7. The method according to claim 6, wherein when N is equal to the first value, the target time interval comprises a time unit between a first time unit and a second time unit; the first time unit is a time unit in which transmission of a physical downlink control channel used to carry the first DCI ends; and the second time unit is a time unit in which transmission of the physical uplink shared channel or a physical downlink shared channel starts, wherein the physical uplink shared channel or the physical downlink shared channel is used to carry the one or more TBs scheduled by the first DCI.

8. The method according to claim 6, wherein when N is less than the first value, the target time interval comprises a time unit between a third time unit and a second time unit;

the third time unit is an Mth time unit before transmission of the physical uplink shared channel or a physical downlink shared channel starts; and the second time unit is a time unit in which the transmission of the physical uplink shared channel or the physical downlink shared channel starts, wherein the third time unit is after a time unit in which transmission of a physical downlink control channel used to carry the first DCI ends, the physical uplink shared channel or the physical downlink shared channel is transmitted after the physical downlink control channel used to carry the first DCI, and M is an integer greater than or equal to 2.

9. The method according to claim 6, wherein when N is less than the first value, the method further comprises:
sending, by the network device, second DCI to the terminal device, wherein a duration from a time unit in which transmission of a physical uplink shared channel used to carry a TB scheduled by the second DCI ends to a time unit in which transmission of the physical uplink shared channel used to carry the one or more TBs scheduled by the first DCI starts is less than or equal to 256 milliseconds.

10. A terminal device, comprising:
at least one processor; and
one or more non-transitory memories coupled to the at least one processor and storing programming instructions for execution by the at least one processor to:
receive first downlink control information (DCI) from a network device, wherein the first DCI schedules one or more transport blocks (TBs), a quantity of the one or more TBs is N and N is an integer greater than or equal to 1; and
skip monitoring a physical downlink control channel in a target time interval, the target time interval based on a value relationship between N and a first value; and
wherein when N is equal to the first value, a transmission duration of a physical uplink shared channel used to carry the one or more TBs scheduled by the first DCI is greater than 256 milliseconds.

11. The terminal device according to claim 10, wherein when N is equal to the first value, the target time interval comprises a time unit between a first time unit and a second time unit; the first time unit is a time unit in which transmission of a physical downlink control channel used to carry the first DCI ends; and the second time unit is a time unit in which transmission of the physical uplink shared channel or a physical downlink shared channel starts, wherein the physical uplink shared channel or the physical downlink shared channel is used to carry the one or more TBs scheduled by the first DCI.

12. The terminal device according to claim 10, wherein when N is less than the first value, the target time interval comprises a time unit between a third time unit and a second time unit; the third time unit is an Mth time unit before transmission of the physical uplink shared channel or a physical downlink shared channel starts; and the second time unit is a time unit in which the transmission of the physical uplink shared channel or the physical downlink shared channel starts, wherein the third time unit is after a time unit in which transmission of a physical downlink control channel used to carry the first DCI ends, the physical uplink shared channel or the physical downlink shared channel is transmitted after the physical downlink control channel used to carry the first DCI, and M is an integer greater than or equal to 2.

13. The terminal device according to claim 10, wherein when N is less than the first value, the programming instructions are further executed by the at least one processor to:
receive second DCI from the network device, wherein duration from a time unit in which transmission of a physical uplink shared channel used to carry a TB scheduled by the second DCI ends to a time unit in which transmission of the physical uplink shared channel used to carry the one or more TBs scheduled by the first DCI starts is less than or equal to 256 milliseconds.

14. A network device, comprising:
at least one processor; and
one or more memories coupled to the at least one processor and storing programming instructions for execution by the at least one processor to:
send first downlink control information (DCI) to a terminal device, wherein the first DCI schedules one or more transport blocks (TBs), a quantity of the one or more TBs is N and N is an integer greater than or equal to 1; and
skip sending DCI in a target time interval, the target time interval based on a relationship between N and a first value; and
wherein when N is equal to the first value, a transmission duration of a physical uplink shared channel used to carry the one or more TBs scheduled by the first DCI is greater than 256 milliseconds.

15. The network device according to claim 14, wherein when N is equal to the first value, the target time interval comprises a time unit between a first time unit and a second time unit; the first time unit is a time unit in which transmission of a physical downlink control channel used to carry the first DCI ends; and the second time unit is a time unit in which transmission of the physical uplink shared channel or a physical downlink shared channel starts, wherein the physical uplink shared channel or the physical downlink shared channel is used to carry the one or more TBs scheduled by the first DCI.

16. The network device according to claim 14, wherein when N is less than the first value, the target time interval comprises a time unit between a third time unit and a second time unit; the third time unit is an Mth time unit before transmission of the physical uplink shared channel or a physical downlink shared channel starts; and the second time unit is a time unit in which the transmission of the physical uplink shared channel or the physical downlink shared channel starts, wherein the third time unit is after a time unit in which transmission of a physical downlink control channel used to carry the first DCI ends, the physical uplink shared channel or the physical downlink shared channel is transmitted after the physical downlink control channel used to carry the first DCI, and M is an integer greater than or equal to 2.

* * * * *